United States Patent
Ma et al.

(10) Patent No.: US 8,463,073 B2
(45) Date of Patent: Jun. 11, 2013

(54) ROBUST RECOVERY OF TRANSFORM INVARIANT LOW-RANK TEXTURES

(75) Inventors: Yi Ma, Beijing (CN); Zhengdong Zhang, Beijing (CN); Xiao Liang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 242 days.

(21) Appl. No.: 12/955,734

(22) Filed: Nov. 29, 2010

(65) Prior Publication Data

US 2012/0133779 A1 May 31, 2012

(51) Int. Cl.
*G06K 9/36* (2006.01)

(52) U.S. Cl.
USPC .......................................... 382/289

(58) Field of Classification Search
None
See application file for complete search history.

(56) References Cited

U.S. PATENT DOCUMENTS

| | | | |
|---|---|---|---|
| 5,511,153 A | 4/1996 | Azarbayejani et al. | |
| 6,469,710 B1 | 10/2002 | Shum et al. | |
| 2005/0128197 A1* | 6/2005 | Thrun et al. | 345/421 |
| 2005/0285872 A1* | 12/2005 | Wang et al. | 345/582 |
| 2008/0246760 A1 | 10/2008 | Jeong et al. | |
| 2009/0046932 A1* | 2/2009 | Francos et al. | 382/209 |
| 2011/0064302 A1* | 3/2011 | Ma et al. | 382/159 |
| 2011/0311121 A1* | 12/2011 | Zhang et al. | 382/131 |

FOREIGN PATENT DOCUMENTS

| | | |
|---|---|---|
| JP | 07182495 A | 7/1995 |
| WO | 9706512 A2 | 2/1997 |
| WO | 2006031213 A1 | 3/2006 |

OTHER PUBLICATIONS

Peng, et al., "RASL: Robust Alignment by Sparse and Low-rank Decomposition for Linearly Correlated Image," CVPR 2010, Jun. 13-18, 2010.*
Koo and Cho, "Rectification of figures and photos in document images using bounding box interface," CVPR 2010, pp. 3121-3128, 2010.*
Zhang, et al., "TILT: Transform Invariant Low-Rank Textures," ACCV 2010, Part III, LNCS 6494, pp. 314-328, 2011.*
Capel and Zisserman, "Automated Mosaicing with Super-resolution Zoom," IEEE Computer Vision and Pattern Recognition 1998, pp. 885-891, Jun. 23-25, 1998.*
Hartley, "Self-calibration from multiple views with a rotating camera." In Proc. ECCV, LNCS 800/801, pp. 471-478. Springer-Verlag, 1994.*
Wu et al., "Online Robust Image Alignment via Iterative Convex Optimization," CVPR 2012.*

(Continued)

*Primary Examiner* — Barry Drennan
*Assistant Examiner* — Andrew Moyer
(74) *Attorney, Agent, or Firm* — Lyon & Harr, LLP; Mark A. Watson

(57) ABSTRACT

A "Transform Invariant Low-Rank Texture" (TILT) Extractor, referred to as a "TILT Extractor" accurately extracts both textural and geometric information defining regions of low-rank planar patterns from 2D images of a scene, thereby enabling a large range of image processing applications. Unlike conventional feature extraction techniques that rely on point-based features, the TILT Extractor extracts texture regions from an image and derives global correlations or transformations of those regions in 3D (e.g., transformations including translation, rotation, reflection, skew, scale, etc.). These image domain transformations inherently provide information relative to an automatically determinable camera viewing direction. In other words, the TILT Extractor extracts low-rank regions and geometric correlations describing domain transforms of those regions relative to arbitrary camera viewpoints. The TILT Extractor also identifies sparse error in image intensity or other color channels resulting from noise, occlusions or other artifacts, thereby allowing elimination or reduction of such errors in images.

20 Claims, 13 Drawing Sheets

OTHER PUBLICATIONS

Jing et al., "Image Super-resolution Reconstruction Based on Sparse Representation and Low-rank Matrix Completion," Journal of information & Computational Science 9: 13 (2012), 3859-3866.*

Huang et al., "Simultaneous image transformation and sparse representation recovery," CVPR 2008.*

Yang et al., "Image super-resolution as sparse representation of raw image patches," CVPR 2008.*

Cui, et al., "Interactive Hyperspectral Image Visualization Using Convex Optimization", IEEE Transactions on Geoscience and Remote Sensing, vol. 47, Issue 6, pp. 12.

Candes, et al., "Exact Matrix Completion via Convex Optimization", Caltech, May 2008, pp. 1-49.

Wang, et al., "A New Room Decoration Assistance System Based on 3D Reconstruction and Integrated Service", CIVR'08, Jul. 7-9, 2008, pp. 627-633.

Moses, et al., "Noncoherent 2D and 3D SAR Reconstruction from Wide-Angle Measurements", Department of Electrical and Computer Engineering Ohio State University, Jun. 2005, pp. 6.

Salzmann, et al., "Convex Optimization for Deformable Surface 3-D Tracking", ICCV 2007, Oct. 2007, pp. 8.

Clerc, et al., "The texture gradient equation for recovering shape from texture", IEEE Transactions on Pattern Analysis and Machine Intelligence, vol. 24, No. 4, Apr. 2002, pp. 536-549.

Mikolaczyk, et al., "A Performance Evaluation of Local Descriptors", IEEE Transactions on Pattern Analysis and Machine Intelligence, vol. 27, No. 10, Oct. 2005, pp. 1-7.

Winder, et al., "Learning Local Image Descriptor", Computer Vision and Pattern Recognition—CVPR, 2007, Jun. 17-22, 2007, pp. 8.

Lowe David, G. "Distinctive Image Features from Scale-Invariant Key points", International Journal of Computer Vision, Jan. 5, 2004, pp. 1-28.

Mikolaczyk, et al., "Scale and Affine Invariant Interest Point Descriptors", International Journal of Computer Vision 60(1), 2004, pp. 24.

Morel, et al., "ASIFT: A New Framework for Fully Affine Invariant Image Comparison", SIAM Journal Imaging Sciences vol. 2, No. 2, 2009, pp. 438-469.

Sundaramoorthi, et al., "On the Set of Images Modulo Viewpoint and Constrast Changes", IEEE Conference on Computer Vision and Pattern Recognition, Apr. 7, 2009, pp. 1-22.

Ma, et al., "An Invitation to 3D Vision From Images to Models", Nov. 19, 2001, pp. 338.

Kosecka, et al., "Extraction, Matching, and Pose Recovery Based on Dominant Rectangular Structures", CVGIP: Image Understanding, 100(3), Feb. 26, 2005, pp. 274-293.

Schindler, et al., "Detecting and Matching Repeated Patterns for Automatic Geo-Tagging in Urban Environments", CVPR 2008, Jun. 23-28, 2008, pp. 7.

Park, et al., "Performance Evaluation of State-of-the-Art Discrete Symmetry Detection Algorithms", CIEEE International Conference on Computer Vision and Pattern Recognition, 2008, pp. 8.

Yang, et al., "Symmetry-Based 3-D Reconstruction from Perspective Images", Computer Vision and Image Understanding 99, Jan. 31, 2005, pp. 210-240.

Levina, et al., "Texture Synthesis and Non-Parametric Resampling of Random Fields", The Annals of Statistics 2006, vol. 34, No. 4, 2006, pp. 1-25.

Garding, et al., "Direct Computation of Shape Cues Using Scale-Adapted Spatial Derivative Operators", Feb. 1993, Published in International J. Computer Vision, 17(2), 1996, pp. 42.

Peng, et al., "RASL: Robust Alignment by Sparse and Low-Rank Decomposition for Linearly Correlated Image", CVPR 2010, Jun. 13-18, 2010, pp. 8.

Candes, et al., "Robust Principal Component Analysis?", Computing Research Repository—CORR, vol. abs/0912.3, 2009, Dec. 17, 2009, pp. 1-39.

"International Search Report", Mailed Date: Apr. 18, 2012, Application No. PCT/US2011/059941, Filed Date: Nov. 9, 2011, pp. 10.

* cited by examiner

INPUT IMAGE (Rank = 35). Black rectangle (420) is input window processed by TILT Extractor. White trapezoid (430) represents the texture region extracted by the Tilt Extractor prior to deformation to minimize texture rank.

OUTPUT TEXTURE (Rank = 14) extracted from input image.

ROBUST RECOVERY OF TRANSFORM INVARIANT LOW-RANK TEXTURES

BACKGROUND

1. Technical Field

A "Transform Invariant Low-Rank Texture" (TILT) Extractor, as described herein, accurately and robustly extracts both textural and geometric information defining regions of low-rank planar patterns from 2D images of a scene, thereby enabling a large range of image processing applications.

2. Background

One of the basic problems in computer vision is to identify certain feature points or salient regions in images. Those points and regions are the basic building blocks for almost all high-level vision tasks such as 3D reconstruction, object recognition, scene understanding, etc. Throughout the years, a large number of methods have been proposed in the computer vision literature for extracting various types of feature points or salient regions. The detected points or regions typically represent parts of the image which have certain distinctive geometric or statistical properties such as, for example, Canny edges, Harris corners, textons, etc.

Since distinctive points or regions in images are often used to establish correspondence or measure similarity across different images, they are desired to have properties that are somewhat stable or invariant under transformations incurred by changes in viewpoint or illumination. In the past decade, numerous so-called "invariant" features and descriptors have been proposed, studied, compared, and tuned in the literature. A representative, and widely used, type of feature is the "scale invariant feature transform" (SIFT), which is, to a large extent, invariant to changes in rotation and scale (i.e., similarity transforms) and illumination.

Unfortunately, if the images undergo significant affine transforms (e.g., perspective transforms), SIFT based techniques often fail to establish reliable correspondences and its affine-invariant version becomes a more appropriate choice. However, while deformation of a small distant patch can be well-approximated by an affine transform, projective transform is used instead to describe the deformation of a large region viewed by a perspective camera. Consequently, it is believed that the current state of the art does not provide features or descriptors that are truly invariant (or even approximately so) under projective transforms (i.e., homography). Despite tremendous effort in the past few decades to search for better and richer classes of invariant features in images, this seems to be a problem that none of the existing methods have been able to fully resolve. Therefore, the numerous "invariant" image features proposed in the current vision literature (including the ones mentioned above) are, at best, approximately invariant, and often only to a limited extent.

For example, considering typical classes of transformations incurred on the image domain by changing camera viewpoint and on the image intensity by changing contrast or illumination, in strict mathematical sense, invariants of the 2D image are extremely sparse and scarce—essentially, only the topology of the extrema of the image function remains invariant. This has been referred to as the "attributed Reeb tree" (ART).

On the other hand, a 3D scene is typically rich with regular structures that are full of invariants (with respect to 3D Euclidean transforms). For instance, in many urban environments, the scene is typically full of man-made objects that may have parallel lines, right angles, regular shapes, symmetric structures, repeated patterns, etc. All these geometric structures are rich in properties that are invariant under all types of subgroups of the 3D Euclidean group. As result, 2D (affine or perspective) images of such 3D scenes typically encode extremely rich 3D information about objects in the scene. Unfortunately, existing feature extraction techniques generally deal poorly with this information, especially in the case of projective transforms.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, a "Transform Invariant Low-Rank Texture" (TILT) Extractor, as described herein, provides various techniques for efficiently and effectively extracting a rich class of low-rank textures representing regions of a 3D scene from 2D images of the scene despite significant and concurrent domain transforms (including both affine and projective transforms). Examples of such domain transforms include, but are not limited to, translation, rotation, reflection, skew, scale, etc. The low-rank textures provided by the TILT Extractor are useful for capturing geometrically meaningful structures in an image, which encompass conventional local features such as edges and corners as well as all kinds of approximately regular or approximately symmetric patterns, ubiquitous in urban environments and with other natural or man-made objects. Note that, as is well understood by those skilled in the art of linear algebra and matrix math, the rank of a linear map (corresponding to the output texture in this case) is the dimension of the linear map corresponding to the number of nonzero singular values of the map.

In other words, the TILT Extractor extracts both textural and geometric information defining regions of low-rank planar patterns from 2D images of a scene. In contrast to conventional feature extraction techniques that rely on point-based features, the TILT Extractor extracts a plurality of regions from an image and derives global correlations or transformations of those regions in 3D (e.g., transformations including translation, rotation, reflection, skew, scale, etc.) relative to an arbitrary, but automatically determinable, camera viewpoint (or viewing direction). In general, these regions are identified by processing windows of the image to identify the extracted region. In various tested embodiments, it was observed that window sizes having a minimum size of about 20×20 pixels produced good results. However, it should be understood that window size may be dependent on a number of factors, including, for example, overall image size, and the size of texture regions within the image.

More specifically, the TILT Extractor is capable of finding and extracting low-rank textures by adapting convex optimization techniques that enable robust recovery of a high-dimensional low-rank matrix despite gross sparse errors to the image processing techniques described herein. By adapting these matrix optimization techniques to the image processing operations described herein, even for image regions having significant projective deformation, the TILT Extractor is capable of accurately recovering intrinsic low-rank textures and the precise domain transforms from a single image. The TILT Extractor directly applies to image regions of arbitrary sizes where there are certain approximately regular structures, even in the case of significant transforms, image corruption, noise, and partial occlusions. Extensive experimental testing of various embodiments of the TILT Extractor have demonstrated the effectiveness of the TILT Extractor in locating and extracting many near-regular patterns or objects that are approximately low-rank, such as, for example, human faces, texts, building façades, cars, plant leaves, flowers, etc.

The TILT Extractor finds the low-rank textures in an image by conducting an effective window-based search for the actual deformation (i.e., domain transforms) of the image in order to decompose the image into a low-rank component and a sparse error component relating to image intensity (or other image color channel). The TILT Extractor finds optimal domain transforms by minimizing the rank of an undeformed (i.e., untransformed) version of the original image subject to some sparse errors by using convex optimization techniques to recover the low-rank textures from a sparse representation of the image.

Note that large numbers of low rank textures can be extracted from a single image, such as, for example, multiple windows on the façade of a high-rise building. Note also that the rectification process inherent in the texture extraction techniques described herein provides a measure of the specific domain transforms (translation, rotation, reflection, skew, scale, etc.) that would be used to construct the low-rank textures identified in a particular image of a 3D scene. Consequently, the regions extracted by the TILT Extractor have associated geometric information that can be used to rectify those regions, or to enable a wide variety of image processing applications relative to those regions and to the input image as a whole.

In view of the above summary, it is clear that the TILT Extractor described herein provides various unique techniques for extracting low-rank textures and corresponding domain transformation information from images. In addition to the just described benefits, other advantages of the TILT Extractor will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
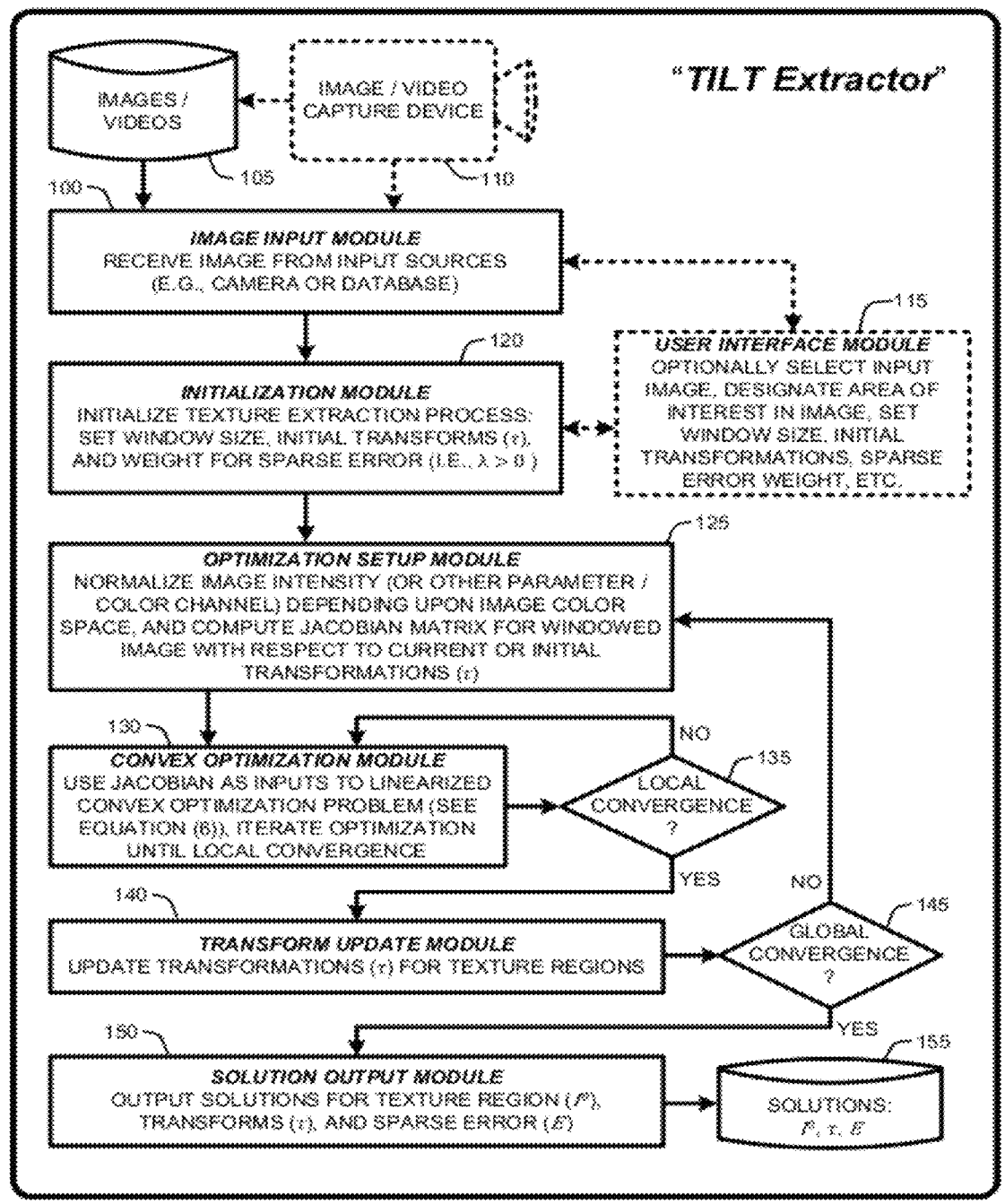
FIG. 1 provides an exemplary architectural flow diagram that illustrates program modules for accurately and robustly extracting both textural and geometric information defining regions of low-rank planar patterns from 2D images of a scene using a "TILT Extractor", as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, as described herein, a "Transform Invariant Low-Rank Texture" (TILT) Extractor, referred to herein as a "TILT Extractor", provides various techniques for accurately and robustly extracting both textural and geometric information defining regions of low-rank planar patterns from 2D images of a scene, thereby enabling a large range of image processing applications. In contrast to conventional feature extraction techniques that rely on point-based features, the TILT Extractor extracts a plurality of regions from an image and derives global correlations or transformations of those regions in 3D (e.g., transformations including translation, rotation, reflection, skew, scale, etc.). Further, conventional techniques that rely on point-based features are generally incapable of detecting or extracting many regular structures and symmetric patterns that do not even have distinctive features (e.g., butterfly wings). However, the TILT Extractor is fully capable of detecting and extracting such features, regardless of affine and projective transforms, relative to arbitrary camera viewpoints.

More specifically, the TILT Extractor directly detects and extracts invariant structures of a scene through their images despite affine and/or projective domain transforms. The TILT Extractor uses an automated convex sparse matrix optimization technique adapted to image processing that processes windows of an input image using a windowed approach effectively and robustly detect and extract regular structures in images despite significant distortion and corruption.

The regions extracted from 2D images by the TILT Extractor correspond to a very rich class of regular patterns on a planar surface in 3D, whose appearance can be modeled as a "low-rank" function. In some sense, many conventional features mentioned above such as edges, corners, and symmetric patterns can all be considered as particular instances of such low-rank textures. Clearly, an image of such a texture may be deformed by the camera projection and undergoes certain domain transformation (e.g., affine and/or projective transformations). In general, the transformed texture is no longer low-rank in the original image. Nevertheless, by utilizing the convex optimization techniques described herein, the TILT Extractor is capable of concurrently recovering such a low-rank texture from its deformed image along with the associated deformation (i.e., the domain transforms that resulted in the deformations observed in the original input image).

Advantageously, the TILT Extractor is capable of directly using raw pixel values of an input image without requiring any sort of pre-processing or pre-extraction of any low-level, local features such as corners, edges, SIFT, and DoG features. The various solutions enabled by the TILT Extractor are inherently robust to small fractions of gross errors caused by corruption (including high levels of noise), occlusion, or cluttered background. Furthermore, the techniques enabled by the TILT Extractor apply to any image regions wherever such low-rank textures occur, regardless of the size of their spatial support. Thus, the TILT Extractor is able to rectify not only small local features, such as an edge or corner, for example, but also large global symmetric patterns such as an entire facade of a building.

Consequently, the TILT Extractor provides a powerful tool for processing one or more images of a scene to provide accurate extraction of rich structural and geometric information about the scene that is truly invariant to image domain transforms. Consequently, the regions extracted by the TILT Extractor have associated geometric information (relative to an automatically determinable camera viewpoint or viewing direction) that can be used to rectify those regions, or to enable a wide variety of image processing applications relative to those regions and to the input image as a whole.

For example, as noted above, the domain transforms identified by the TILT Extractor not only provide information about a particular camera viewpoint (or a camera viewing direction) relative to a scene, but can also be applied to other textures or images that can then be composited back into a particular image. Consequently, extraction of low-rank textures from a building façade captured at some oblique angle will provide the transforms that could be used to produce untransformed low-rank textures of various elements comprising the façade of that building. Applying those same transforms in reverse to another image or texture will cause that transformed image or texture to appear as if it had been captured from within the original image, or at least from the same viewpoint or viewing direction as the original image was captured. Compositing such images or textures into the original image enables the creation of photorealistic composite images to be constructed using the transforms that are automatically extracted from the original image.

Another interesting example of the use of the low-rank textures extracted by the TILT Extractor is that by extracting low-rank textures from multiple images of the same scene (captured from various viewpoints), multiple instances of the same low-rank texture will be extracted from the scene. The multiple instances of a particular texture can then be used for a variety of purposes, such as, for example, super-resolution operations. A simple example of such a super-resolution operation would be to capture multiple images of a scene containing text. Since the domain transforms are used to rectify these regions, multiple copies of a particular low-rank region of the scene extracted by TILT Extractor can then be combined using a variety of super-resolution techniques to enhance the resolution of text within the extracted region to a level exceeding anything in any of the original images. Similar enhancement techniques can be applied to faces or any other object or texture within a scene for which multiple images are available.

Note that additional examples of various applications and uses of the TILT Extractor are discussed below in Section 2.7 following a detailed description of various operational embodiments of the TILT Extractor.

1.1 System Overview:

As noted above, the "TILT Extractor" provides various techniques for extracting low-rank textures and corresponding domain transformation information from images. The processes summarized above are illustrated by the general system diagram of FIG. 1. In particular, the system diagram of FIG. 1 illustrates the interrelationships between program modules for implementing various embodiments of the TILT Extractor, as described herein. Furthermore, while the system diagram of FIG. 1 illustrates a high-level view of various embodiments of the TILT Extractor, FIG. 1 is not intended to provide an exhaustive or complete illustration of every possible embodiment of the TILT Extractor as described throughout this document.

In addition, it should be noted that any boxes and interconnections between boxes that may be represented by broken or dashed lines in FIG. 1 represent alternate embodiments of the TILT Extractor described herein, and that any or all of these alternate embodiments, as described below, may be used in combination with other alternate embodiments that are described throughout this document.

In general, as illustrated by FIG. 1, the processes enabled by the TILT Extractor begin operation by using an image input module 100 to receive an image or video 105. The image or video 105 is either pre-recorded, or is recorded or captured using a conventional image or video capture device 110. Note also that an optional user interface module 115 can be used to select from a library or list of the images or videos 105, and can also be used to select a live input from the image or video capture device 110.

Once the image sequence or video 110 has been selected or otherwise specified, it is provided to an initialization module 120. The initialization module 120 receives the input image and initializes parameters to be used by the TILT extractor. In general, this initialization includes setting window size (i.e., image is divided into windows), optionally specifying initial transformation parameters, and setting a weight for weighting a "sparse error" component extracted from input images. In general, this sparse error represents artifacts such as noise, occlusions, etc., in the image intensity (or other color channel, depending upon the image color space). Note that the aforementioned parameters can be specified via the optional user interface module 115, if desired. Once the initial parameters have been set or specified, these parameters are used for processing windows of the image via an iterative convex optimization process, described below. Note that in various tested embodiments, it was observed that windows having a minimum size of about 20×20 pixels produced good results. However, it should be understood that, as discussed in further detail below, window size may be dependent on a number of factors, including, for example, image size, and the size of texture regions in the image.

Following the initialization process described above, an optimization setup module 125 uses the above-described initialization parameters in combination with the input image or video 105 to initialize the iterative convex optimization process that extracts texture regions (I⁰), associated geometric information (i.e., transforms, τ), and sparse errors (E) from the input image. In general, the optimization setup module 125 first normalizes an intensity or brightness channel of the input image (though other image color channels can also be processed, as discussed in Section 2.2.2 and Section 2.4.1 with respect to Algorithm 1). Once normalized, the optimization setup module 125 then computes a Jacobian matrix for the windowed input image based on the initial (or current) transform, τ (see Algorithm 1 in Section 2.3.1).

The Jacobian matrix is then provided to a convex optimization module 130 for iterative processing. In general, as described in further detail below, the iterative convex optimization process performed by the convex optimization module 130 operates to solve a linearized convex optimization using the matrix computed from the windowed input image. This iterative process repeats until local convergence 135 of the transform τ is achieved based on the current matrix.

Once local convergence of the transform τ is achieved with the current matrix, a transform update module 140 updates the current value of τ (using the local convergence information) for each window, and a determination is then made as to whether a global convergence of the transform, τ, has been achieved. In each pass of the global convergence check, the current transform, τ, is compared to the initial or prior transform, τ, with a global convergence being achieved when the change between the current and prior τ values are less than some relatively small threshold.

If global convergence has not been achieved, then the current value of τ is provided back to the optimization setup module 125. The optimization setup module 125 the renormalizes the image intensity (or other image parameter, as noted above) and recomputes a new Jacobian matrix using the current transform, τ, with this information then being provided again to the convex optimization module 130. The above-described iterative process then repeats until global convergence 145 has been achieved, at which time, a solution output module 150 outputs the optimized solutions for texture regions (I⁰), associated geometric information (i.e., transforms, τ), and sparse errors (E) from the original input image. These solutions 155 are then provided for use in any of a large number of image processing applications.

2.0 Operational Details of the TILT Extractor:

The above-described program modules are employed for implementing various embodiments of the TILT Extractor. As summarized above, the TILT Extractor provides various techniques for extracting low-rank textures and corresponding domain transformation information from images. The following sections provide a detailed discussion of the operation of various embodiments of the TILT Extractor, and of exemplary methods for implementing the program modules described in Section 1 with respect to FIG. 1. In particular, the following sections provide examples and operational details of various embodiments of the TILT Extractor, including: a definition of low-rank textures and associated elements; deformed and corrupted low-rank textures; iterative convex optimization; additional constraints and implementation details; multi-resolution enhancements to optimization; operational considerations; and examples of additional embodiments and applications.

2.1 Low-Rank Textures and Associated Definitions:

In general, for purposes of explanation, a 2D texture is considered to be a function $I^0(x,y)$, defined on a plane $\mathbb{R}^2$. A texture $I^0$ is defined to be a low-rank texture if the family of functions $I^0(x,\cdot)$ span a finite low-dimensional subspace, as illustrated by Equation (1), where:

$$r = \text{rank}(I^0) \doteq \dim(\text{span}\{x|I^0(x,\cdot)\}) \leq k \qquad \text{Equation (1)}$$

for some small integer k. In this case, $I^0$ is said to be a rank-r texture. Note that in general, the rank, k, is smaller than the number of pixels in the window being evaluated and generally should not exceed around one-half the number of pixels in the window. Note that a vertical or horizontal edge (or slope) can be considered as a rank-1 texture, while a corner can be considered as a rank-2 texture. It is easy to see that the image of any symmetric pattern has a rank at most half of its dimension. Thus, any regular symmetric patterns will result in low-rank textures.

Figure 2:
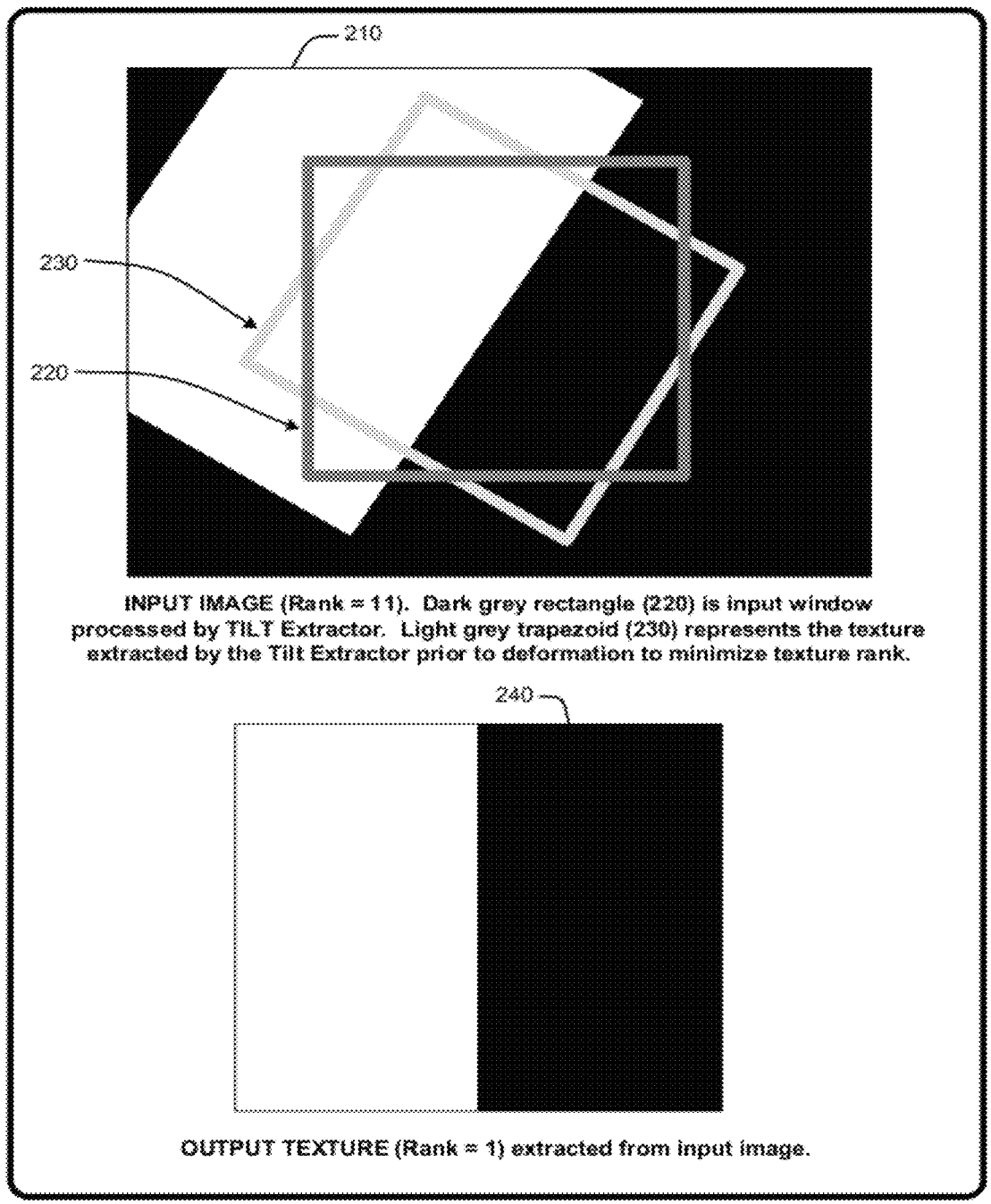
FIG. 2 illustrates an example of an input image having a simple slope resulting in a low-rank texture region output following processing by the TILT Extractor, as described herein.
Figure 3:
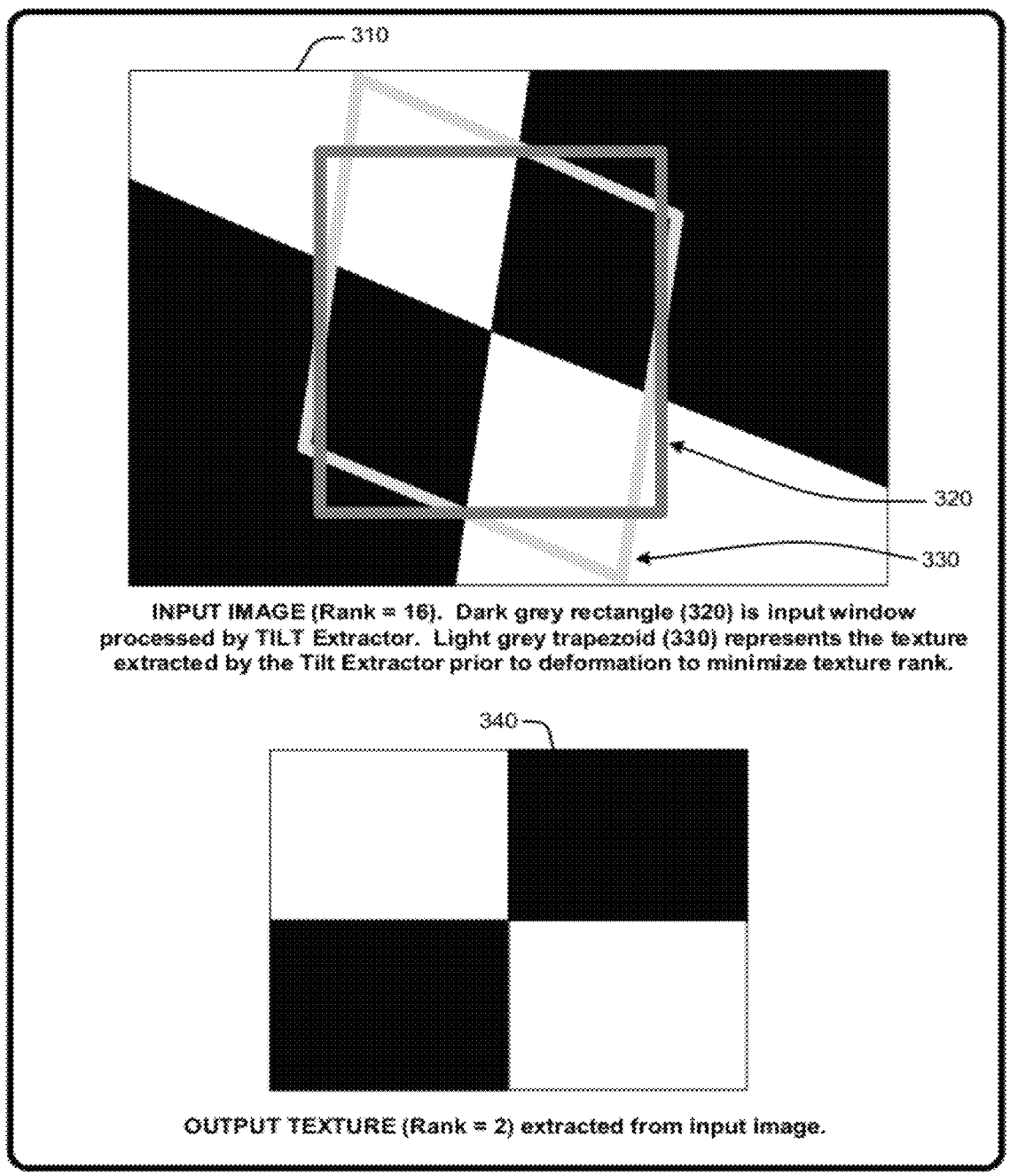
FIG. 3 illustrates an example of an input image having a simple corner region captured from an oblique viewing direction resulting in a low-rank texture region output following processing by the TILT Extractor, as described herein.

For example, FIG. 2 shows an example of an input image 210 having a simple slope as the texture in an input window 220. In this example, the rank of the slope (rank=11 in this example) is minimized by extracting a region 230 corresponding to the input window 220 to produce the output texture 240 having rank=1, as illustrated. Similarly, FIG. 3 illustrates an input image 310 having corners as the texture in an input window 320. Note that an image of a checkerboard captured from some oblique viewing position would produce an image similar to input image 310. In this example, the rank of the corner (rank=16 in this example) is minimized by extracting a region 330 corresponding to the input window 320 to produce the output texture 340 having rank=2, as illustrated.

Given a low-rank texture, its rank is invariant under any scaling of the function, as well as scaling or translation in the x and y coordinates. In other words, if $g(x,y) \doteq cI^0(ax+t_1, by+t_2)$ for some constants: a, b, c, $t_1, t_2 \in \mathbb{R}_+$, then $\text{rank}(I^0(x,y)) = \text{rank}(g(x,y))$. For most practical purposes, it suffices to recover any scaled version of the low-rank texture $I^0(x,y)$, as any remaining ambiguity left in the scaling can often be easily resolved by imposing additional constraints on the texture (see Section 2.4). Consequently, as discussed throughout this document, unless otherwise stated, two low-rank textures are viewed as equivalent if they are scaled (and/or translated) versions of each other, i.e., $I^0(x,y) \sim cI^0(ax+t_1, by+t_2)$, with a, b, c, $t_1, t_2 \in \mathbb{R}_+$, where a, b, c represent scaling factors, and $t_1, t_2$ represent translations.

In practice, the 2D texture is generally not provided as a continuous function in $\mathbb{R}^2$. Typically, only its values sampled on a finite discrete grid are provided, such as, for example, an m×n grid in $\mathbb{Z}^2$. In this case, the 2D texture $I^0(x,y)$ becomes an m×n matrix in $\mathbb{R}^{m \times n}$. Note that it is assumed that the number of samples m or n are significantly larger than the intrinsic rank of the texture, as illustrated by Equation (2):

$$r \ll \min\{m,n\} \qquad \text{Equation (2)}$$

Note also that as long as the sampling rate is not one of the aliasing frequencies of the function $I^0$, the resulting matrix has the same rank as the continuous function. As result, the 2D texture $I^0(x,y)$ (discretized) as a matrix is very low-rank relative to its dimension.

2.1.1 Note Regarding Low-Rank Textures Versus Random Textures:

Conventionally, the word "texture" is used to describe image regions that exhibit certain spatially stationary stochastic properties (e.g., grass, sand, etc.). As is well known to those skilled in the art, such a texture can be considered as a random sample from a stationary stochastic process and is generally of full rank as a 2D function. The "low-rank textures" defined here are complementary to such random textures. In particular, these low-rank textures describe regions in an image that have approximately regular deterministic structures.

2.2 Deformed and Corrupted Low-Rank Textures:

In practice, it is unlikely to find a perfectly low-rank texture in a real image, largely due to two factors: 1) the change of viewpoint usually induces a transformation on the domain of the texture function; and 2) the sampled values of the texture function are subject to a variety of imperfections such as, for example, quantization, noise, occlusions, corruptions, etc. Therefore, in order to correctly extract the intrinsic low-rank textures from such deformed and corrupted image measurements, the TILT Extractor first carefully models those factors and then seeks ways to eliminate them, as discussed in further detail below.

2.2.1 Deformed Low-Rank Textures:

Although many surfaces or structures in 3D exhibit low-rank textures, their images do not. In particular, it is assumed that such a texture $I^0(x,y)$ lies approximately on a planar surface in the scene, and that the image $I(x,y)$ observed from a particular viewpoint is a transformed version of the original low-rank texture function $I^0(x,y)$:

$$I = I^0 \circ \tau^{-1} \qquad \text{Equation (3)}$$

where $\tau$ belongs to a particular "Lie group" $\mathbb{G}$. Note that Lie groups are well known to those skilled in the art, and will not be discussed in detail herein. Note that for purposes of explanation, the following discussion assumes that $\mathbb{G}$ is either the 2D affine group, Aff(2), or the homography group, GL(3), for projective transforms (i.e., 3D transforms), acting linearly on the image domain. Note that use of the terms Aff(A) and GL(V) are known to skilled in the art of affine groups, general linear groups, and Lie groups, and will not be discussed in further detail herein. Further, it should be understood that the techniques described herein are applicable to more general classes of domain deformations or camera projection models as long as they can be modeled well by a finite-dimensional parametric family. In general, the transformed texture $I(x,y)$ as a matrix is no longer low-rank. For instance, a horizontal edge has rank=1, but after rotating 45°, it becomes a full-rank diagonal edge (see discussion of FIG. 2 provided above for a specific example of this concept).

2.2.2 Corrupted Low-Rank Textures:

In addition to domain transformations, the observed image of the texture might be corrupted by noise and occlusions or contain some surrounding backgrounds. Such deviations are modelled as:

$$I = I^0 + E \qquad \text{Equation (3)}$$

for some error function E. As result, the image I is no longer perfectly low-rank as $I^0$. Note that for purposes of discussion, it is assumed that only a small fraction of the image pixels are corrupted by large errors. Therefore, E is (approximately) a sparse matrix.

As discussed in further detail in the following paragraphs, the TILT Extractor operates to recover the low-rank texture $I^0$ from an image that contains a deformed and/or corrupted version of the low rank texture. More specifically, the TILT Extractor solves the problem of recovering Transform Invariant Low-rank Textures (TILT) from an image. Given a deformed and corrupted image of a low-rank texture: $I = (I^0 + E) \circ \tau^{-1}$ (where, as noted above, $\tau$ represents deformation, and E represents corruption or error in the original image) the TILT Extractor recovers the low-rank texture $I^0$ and the domain transformation $\tau \in \mathbb{G}$. As noted above, the domain transformation recovered along with the texture is useful for a number of image processing applications.

The formulation of this problem is illustrated by the following optimization problem:

$$\min_{I^0, E, \tau} \operatorname{rank}(I^0) + \gamma \|E\|_0 \text{ subject to } I \circ \tau = I^0 + E \qquad \text{Equation (4)}$$

In other words, the optimization problem of Equation (4) finds the texture $I^0$ of the lowest rank and the error E of the fewest nonzero entries that agrees with the observation I relative to a domain transformation $\tau$. Here, $\gamma > 0$ is a Lagrangian multiplier (i.e., a weighting factor) that trades off the rank of the texture versus the sparsity of the error. As noted above, the solution, $I^0$, described herein for this problem, is referred to as a Transform Invariant Low-rank Texture (TILT). As discussed above, scaling does not affect the rank of the texture. Hence, the transforms recovered by the TILT Extractor include (but are not limited to) rotation, skew, perspective transformations, etc.

It is important to understand that a TILT (i.e., a transform invariant low-rank texture) is fundamentally different from conventional affine-invariant features or regions. For example, conventional affine-invariant features or regions are extensions to conventional SIFT features (i.e., scale invariant feature transforms), and in fact, their locations are detected in much the same way as SIFT. Specifically, around each feature an optimal affine transform is found that in some way "normalizes" the local statistics, say by maximizing the isotropy of the brightness pattern, for example.

In contrast, the TILT Extractor finds optimal local deformations by minimizing the rank of the brightness pattern (i.e., the luma channel in a YUV image space). Note that rather than operating on brightness or intensity values in a YUV image space, the TILT Extractor is also capable of operating on individual color channels in any desired color space, such as, for example, RGB, CMYK, or other color space. Further, if desired, any or all color channels in any image space can be processed by the TILT extractor using the techniques described herein.

In general, the TILT Extractor works the same way for any image region of any size (or shape) and for both affine and projective transforms (or even more general transformation groups that have smooth parameterization). It should be noted that, as discussed in further detail below, the TILT Extractor is capable of stratifying or extracting a very wide variety of "regions" that are approximately low-rank (e.g., human faces, texts, buildings, cars, plant leaves, flowers, etc.) and that the results have been observed to match extremely well with human perception.

It is also important to understand that the TILT Extractor is fundamentally different from a conventional technique referred to as "RASL" which deals with "robust alignment by sparse and low-rank" (RASL) decomposition for linearly correlated images. For example, while the RASL technique deals with (and requires) multiple correlated images and multiple transformations, one for each image, the TILT Extractor solves a problem that involves single images and one domain transformation. As such, RASL type techniques are incapable of performing the texture extraction operations for single images provided by the TILT Extractor, as described herein.

More specifically, the TILT Extractor addresses a wide range of textures by incorporating new constraints so that it achieves a large range of convergence. Further, as described in further detail below, the iterative algorithms utilized by the TILT Extractor are applied repeatedly to many different regions of the image using a very fast convex optimization process.

2.3 Iterative Convex Optimization:

As with solutions such as the RASL technique mentioned above, although the rank function and the $l^0$-norm in the optmization problem of Equation (4) are extremely difficult to optimize (in general they are NP-hard), recent breakthroughs in convex optimization have shown that under fairly broad conditions, they can be effectively minimized by their convex surrogates, that is, the matrix nuclear norm $\|I^0\|_*$ for rank ($I^0$) and the $l^1$-norm $\|E\|_1$ for $\|E\|_0$, respectively. As result, the objective function of Equation (4) becomes:

$$\min_{I^0, E, \tau} \|I^0\|_* + \lambda \|E\|_1 \text{ subject to } I \circ \tau = I^0 + E \quad \text{Equation (5)}$$

It should be noted that that although the objective function is now convex, the original constraint, $I \circ \tau = I^0 + E$, remains nonlinear in $\tau \in \mathbb{G}$.

To deal with the nonlinearity in $\tau$ illustrated by Equation (5) it is assumed that $\tau$ is relatively small and that the constraint $I \circ \tau = I^0 + E$ can be linearized around its current estimate: $I \circ (\tau + \Delta \tau) \approx I \circ \tau + \nabla I \Delta \tau$, where $\nabla I$ are the derivatives of the image with respect to the transformation parameters. Strictly speaking, $\nabla I$ is a 3D tensor: it gives a vector of derivatives at each pixel whose length is the number of parameters in the transformation $\tau$. Therefore, when $\nabla I$ is "multiplied" with another matrix or vector, it contracts in the obvious way which should be clear from the context. Thus, locally, the above optimization problem becomes a convex optimization subject to a set of linear constraints, as illustrated by Equation (6):

$$\min_{I^0, E, \Delta \tau} \|I^0\|_* + \lambda \|E\|_1 \text{ subject to} \quad \text{Equation (6)}$$

$$I \circ \tau + \nabla I \Delta \tau = I^0 + E.$$

As this linearization is only a local approximation to the original nonlinear problem, it is solved in an iterative fashion, as described below, in order to converge to a (local) minimum of the original problem. The general idea here is to provide a technique where, in practice, the convex relaxation is tight enough and the linearization is good enough so that the iterative process is likely to converge to a globally optimal solution even starting from a large arbitrary initial deformation, $\tau^0$.

2.3.1 Fast Algorithm Based on Augmented Lagrangian Multiplier:

In general, either an accelerated proximal gradient (APG) method or an augmented Lagrangian multiplier (ALM) method can be adapted for solving the linearized problem of Equation (6). However, the ALM method tends to be more effective for solving these types of convex optimization problems, and typically results in much faster convergence than APG-based algorithms. Thus, for purposes of explanation, the following paragraphs will describe how to customize the ALM method to the linearized problem of Equation (6), followed by a summary of the overall algorithm for solving the original problem of Equation (5).

In general, the ALM method can be used to solve the original constrained convex problem of Equation (6) by introducing an auxiliary Lagrangian function, e.g.:

$$L(I^0, E, \Delta \tau, Y, \mu) \doteq \|I^0\|_* + \lambda \|E\|_1 + \quad \text{Equation (7)}$$

$$\langle Y, I \circ \tau + \nabla I \Delta \tau - I^0 - E \rangle + \frac{\mu}{2} \|I \circ \tau + \nabla I \Delta \tau - I^0 - E\|_F^2$$

The optimal solution to a problem such as Equation (6) can be effectively found for some $\rho > 1$ by iterating the following two steps (with the current rank k being incrementing by one from some initial value (typically zero) at each iteration, as shown) until convergence:

$$\begin{cases} (I_{k+1}^0, E_{k+1}, \Delta \tau_{k+1}) \leftarrow \min_{I^0, E, \Delta \tau} L(I^0, E, \Delta \tau, Y_k, \mu_k), & \text{Equation (8)} \\ \mu_{k+1} \leftarrow \rho \mu_k, Y_{k+1} \leftarrow Y_k + \mu_k (I \circ \tau + \nabla I \Delta \tau_{k+1} - I_{k+1}^0 - E_{k+1}) \end{cases}$$

In general, it is sometimes computationally expensive to find the optimal solution to the first step of Equation (8) by minimizing over all the variables $I^0$, E, $\Delta \tau$ concurrently. Therefore, in various embodiments, to speed up the algorithm, the first step is aproximated by minimizing each of the variables sequentially, as illustrated by Equation (9):

$$\begin{cases} I_{k+1}^0 \leftarrow \min_{I^0} L(I^0, E_k, \Delta \tau_k, Y_k, \mu_k), & \text{Equation (9)} \\ E_{k+1} \leftarrow \min_E L(I_{k+1}^0, E, \Delta \tau_k, Y_k, \mu_k), \\ \Delta \tau_{k+1} \leftarrow \min_{\Delta \tau} L(I_{k+1}^0, E_{k+1}, \Delta \tau, Y_k, \mu_k) \end{cases}$$

Note that It can be shown that under fairly broad conditions, such approximations do not affect the convergence of the algorithm.

Given the structure of the Lagrangian function L defined above, each of the above optimization problems has a very simple solution. In particular, let $S_t[\bullet]$ be a soft thresholding operator with the threshold $t > 0$ and denote: $(U_k, \Sigma_k, V_k) \doteq \text{svd}(I \circ \tau + \nabla I \Delta \tau_k - E_k + \mu_k^{-1} Y_k)$. Then the solution to the problems in Equation (9) are respectively:

$$\begin{cases} I_{k+1}^0 \leftarrow U_k S_{\mu_k^{-1}}[\Sigma_k] V_k^T, & \text{Equation (10)} \\ E_{k+1} \leftarrow S_{\lambda \mu_k^{-1}}[I \circ \tau + \nabla I \Delta \tau_k - I_{k+1}^0 + \mu_k^{-1} Y_k], \\ \Delta \tau_{k+1} \leftarrow (\nabla I^T \nabla I)^{-1} \nabla I^T (-I \circ \tau + I_{k+1}^0 + E_{k+1} - \mu_k^{-1} Y_k) \end{cases}$$

The concepts described above are presented below as "Algorithm 1".

---

Algorithm 1: Extracting Transform Invariant Low-Rank Textures via ALM

Input: A window $I \in \mathbb{R}^{m \times n}$ in an image, initial transformations $\tau$ in certain group $\mathbb{G}$ (affine and/or projective), weight $\lambda > 0$.
While not globally converged Do:
   Step 1: Normalize image intensity (or other parameter/channel depending on image color space), compute Jacobian matrix with respect to initial or current transformation $\tau$:

$$I \circ \tau \leftarrow \frac{I \circ \tau}{\|I \circ \tau\|_F}, \nabla I \leftarrow \frac{\partial}{\partial \zeta} \left( \frac{I \circ \zeta}{\|I \circ \zeta\|_F} \right) \bigg|_{\zeta = \tau};$$

-continued

Algorithm 1: Extracting Transform Invariant Low-Rank Textures via ALM

Step 2: Solve the linearized convex optimization of Equation (6):

$$\min_{I^0, E, \Delta\tau} \|I^0\|_* + \lambda \|E\|_1 \text{ subject to } I \circ \tau + \nabla I \Delta \tau = I^0 + E,$$

with the initial conditions: $Y_0 = 0$, $E_0 = 0$, $\Delta\tau_0 = 0$, $\mu_0 > 0$,
$\rho > 1$, $k = 0$;
While not locally converged Do
$(U_k, \Sigma_k, V_k) \leftarrow \text{svd}(I \circ \tau + \nabla I \Delta\tau_k - E_k + \mu_k^{-1} Y_k)$,
$I_{k+1}^0 \leftarrow U_k S_{\mu_k^{-1}}[\Sigma_k] V_k^T$,
$E_{k+1} \leftarrow S_{\lambda\mu_k^{-1}}[I \circ \tau + \nabla I \Delta\tau_k - I_{k+1}^0 + \mu_k^{-1} Y_k]$,
$\Delta\tau_{k+1} \leftarrow (\nabla I^T \nabla I)^{-1} \nabla I^T (-I \circ \tau + I_{k+1}^0 + E_{k+1} - \mu_k^{-1} Y_k)$,
$Y_{k+1} \leftarrow Y_k + \mu_k (I \circ \tau + \nabla I \Delta\tau_{k+1} - I_{k+1}^0 - E_{k+1})$,
$\mu_{k+1} \leftarrow \rho \mu_k$,
End While
Step 3: Update current transformations: $\tau \leftarrow \tau + \Delta\tau^*$;
End While
Output: Globally converged solution: $I^0$, $E$, $\tau$, where $I^0$ is the transformed texture region, $\tau$ is the transform geometry, and $E$ is the sparse error in the original image.

In general, "Algorithm 1" summarizes the steps of using ALM to solve the problem of Equation (6) for extracting transform invariant low-rank textures (TILT) from an image.

2.4 Additional Constraints and Implementation Details:

As discussed above, Section 2.3.1 described one basic ALM-based algorithm for solving the convexified TILT problem of Equation (6). However, there are a few caveats in applying it to real images of low-rank textures. The following paragraphs describe additional constraints which make the solution to the problem well defined, along with some optional implementation details that generally improves the range of convergence in various cases.

2.4.1 Constraints on the Transformations:

As discussed above in Section 2.1, there are certain ambiguities in the definition of a low-rank texture. In particular, the rank of a low-rank texture function is invariant with respect to scaling in its value, scaling in each of the coordinates, and translation in each of the coordinates. Thus, in order for the problem to have a unique, well-defined optimal solution, the TILT Extractor eliminates those ambiguities. In particular, in Step 1 of Algorithm 1, the intensity or brightness channel of the image is renormalized at each iteration in order to eliminate the scale ambiguity in value. Otherwise, the algorithm may tend to converge to a "globally optimal" solution by rooming into a black pixel. As noted above, other image properties, such as, for example, particular color channels in an RGB image, for example, can be processed in the same manner as the intensity values, though this will depend on the particular image space of the input image.

Regarding the ambiguities left in the domain transformation, additional constraints are used. Note that for simplicity and purposes of explanation, the following discussion assumes the support of the initial image window $\Omega$ is a rectangular region with the length of the two edges being $L(e_1)=a$ and $L(e_2)=b$, so the total area $S(\Omega)=ab$. However, in practice, there is no such requirement, and the initial window can be any shape or size desired. However, initial window shapes other than rectangular may add some relatively small amount of computational complexity to the overall process. In any case, to eliminate the ambiguity in translation, the TILT Extractor acts to ensure that the center, $x_0$, of the initial rectangular region $\Omega$ remains fixed before and after the transformation: $\tau(x_0)=x_0$. This imposes a set of linear constraints on $\Delta\tau$, as illustrated by Equation (11), where:

$$A_t \Delta\tau = 0 \quad \text{Equation (11)}$$

To eliminate the ambiguities in scaling the coordinates, the TILT Extractor ensures (typically only for affine transforms) that the area and the ratio of edge length remain constant before and after the transformation, i.e., $S(\tau(\Omega))=S(\Omega)$ and $L(\tau(e_1))/L(\tau(e_2))=L(e_1)/L(e_2)$. In general, these equalities impose additional nonlinear constraints on the desired transformation $\tau$ in the problem of Equation (5). Similar to the manner in which the nonlinearity was addressed with respect to Equation (5) (see discussion above) the constraints described above can be linearized against the transformation $\tau$ to obtain another set of linear constraints on $\Delta\tau$, as illustrated by Equation (12), where:

$$A_s \Delta\tau = 0 \quad \text{Equation (12)}$$

As a result, to eliminate both scaling and translation ambiguities, the TILT Extractor simply adds two sets of linear constraints to the optimization problem of Equation (6). It should be clear that only very small modifications to Algorithm 1 are needed to incorporate those additional linear constraints. In particular, to address these issues, Algorithm 1 would be modified by introducing an additional set of Lagrangian multipliers and then simply revising the update equation associated with $\Delta\tau_{k+1}$ in accordance with the additional set of multipliers.

2.5 Multi-Resolution Enhancements to Algorithm 1:

To further improve both the speed and the range of convergence, in various embodiments, the TILT Extractor optionally adapts a multi-resolution approach used in image processing to the techniques described herein. In particular, for the given image window I, the TILT Extractor builds a pyramid of images by iteratively blurring and downsampling the window to half the size until the size of the matrix reaches a threshold (say, less than 30×30 pixels, for example) to construct a hierarchical pyramid of downsampled images.

However, in order for the convex relaxation of Equation (5) to be tight enough, the matrix size cannot to be too small. In practice, it has been observed that the techniques described herein work well for windows of size larger than about 20×20 pixels. Starting from the top of the pyramid, Algorithm 1 is applied to the lowest-resolution image first, with the algorithm being initialized using the deformation found from the previous level. It has been observed that this multi-resolution technique significantly improves the range of convergence and robustness of Algorithm 1, since in low-resolution images, small details are blurred out and only main structures of the image drive the updates of the deformation. Moreover, this multi-resolution approach has been observed to speed up Algorithm 1 by hundreds of times in various tested embodiments of the TILT Extractor.

2.5.1 "Branch-and-Bound" Enhancements to Algorithm 1:

In addition to the multi-resolution technique described above, Algorithm 1 can be optionally adapted to work for almost all ranges of deformation by using a branch-and-bound technique. For instance, in the affine case, Algorithm 1 is initialized with different deformations (e.g., a combination search for all 4 degrees of freedom for affine transforms with no translation). A natural concern regarding such a branch-and-bound technique is its effect on speed (i.e., computational overhead). Nevertheless, by operating in cooperation with the multi-resolution technique described above, the branch-and-bound technique only needs to be performed at the lowest-resolution level to find the deformation solution that is used to initialize the higher-resolution levels. Although it can be performed at higher resolutions, if desired, it is generally not necessary to do so.

Since Algorithm 1 is extremely fast for small matrices at the lowest-resolution level, running multiple times with different initializations does not significantly affect the overall performance of the TILT Extractor. In a similar manner, to find the optimal projective transform (homography), the TILT Extractor simply finds the optimal affine transform first (again at the lowest resolution) and then uses that solution to initialize Algorithm 1. It has been observed that in various tested embodiments of the TILT Extractor, with such initializations, it is not necessary to run branch-and-bound for the projective transform, although it can be run, if desired.

2.6 Operational Considerations:

The following paragraphs discuss various operational considerations observed through test and evaluation of various operational embodiments of the TILT extractor.

2.6.1 Robustness of the TILT Extractor:

Experiments on real-world images having random corruptions, occlusions, and cluttered backgrounds, etc., demonstrate that the TILT Extractor is capable of correctly extracting low-rank textures and associated geometry (i.e., τ) from such images. For example, FIG. 4 through FIG. 8 illustrate examples of the extraction of various texture regions, including a butterfly, a face, text, and complex patterns from an input image. Further, FIG. 9 and FIG. 10 provide before and after views that illustrates the removal of noise and scratches or occlusions, respectively, from a low-rank texture recovered from a corrupted input image.

Figure 4:
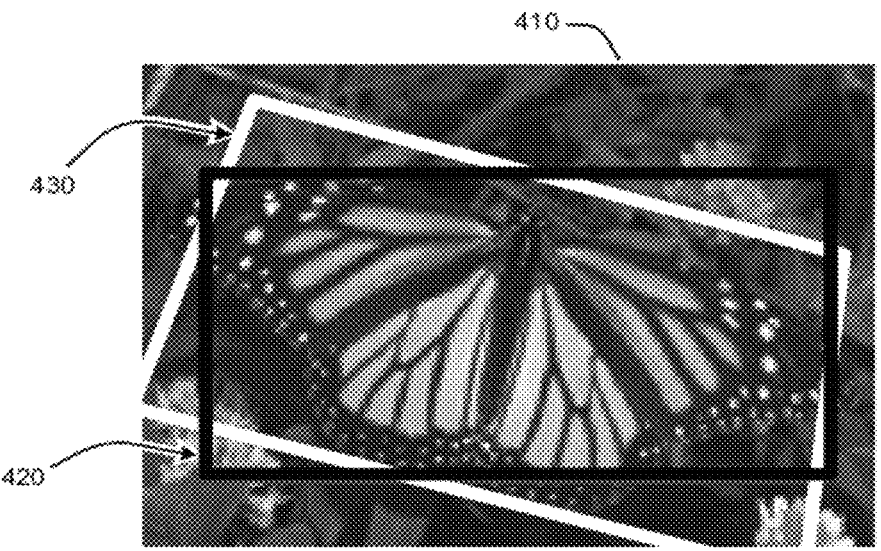
FIG. 4 illustrates an example of the extraction of a low-rank texture region from a high-rank input image, as described herein.
Figure 4:
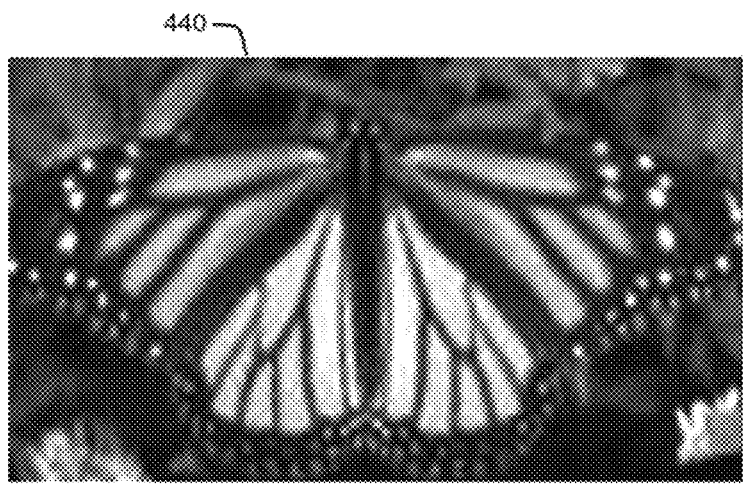
Figure 5:
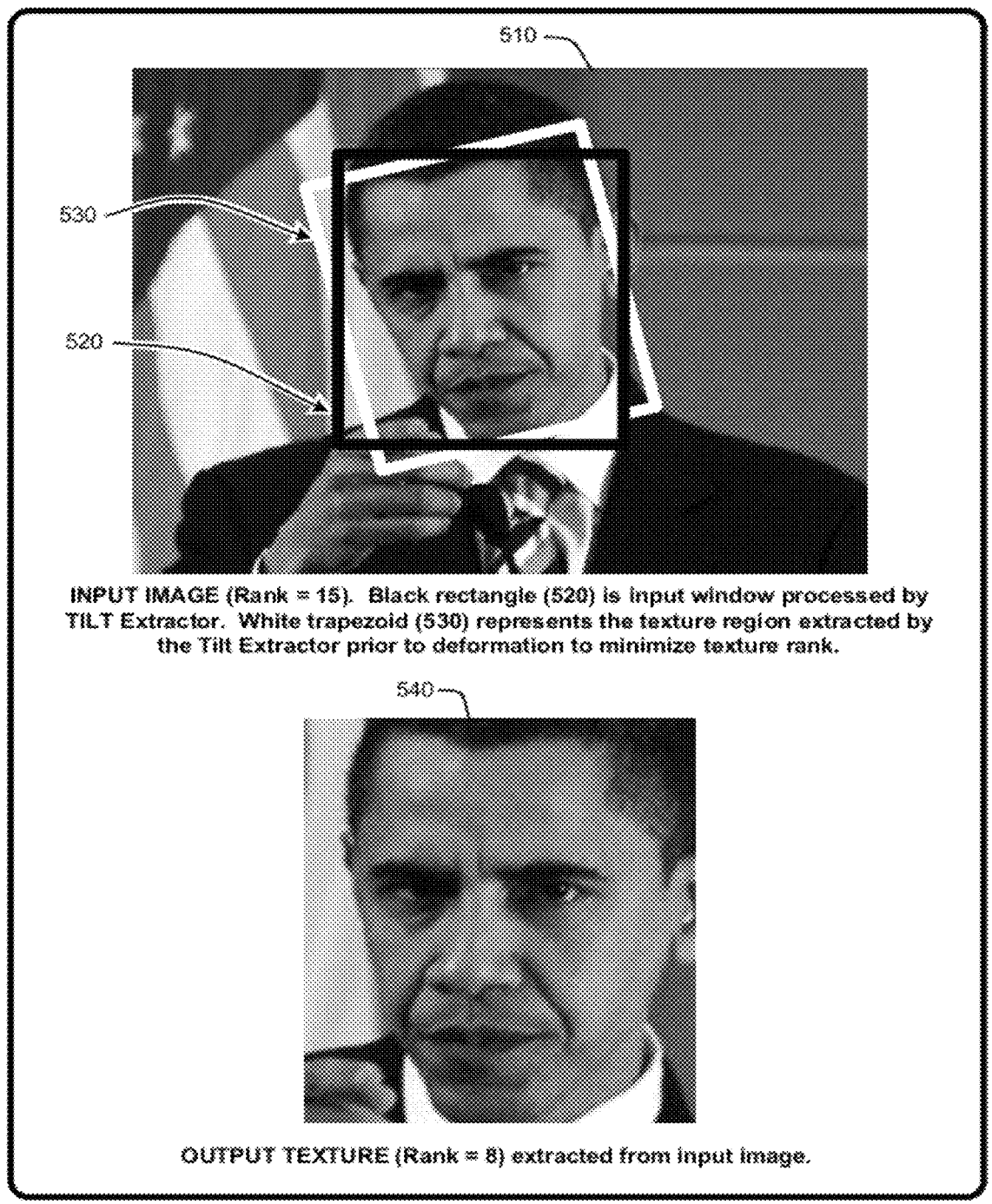
FIG. 5 illustrates an example of the extraction of a low-rank texture region from a high-rank input image, as described herein.
Figure 6:
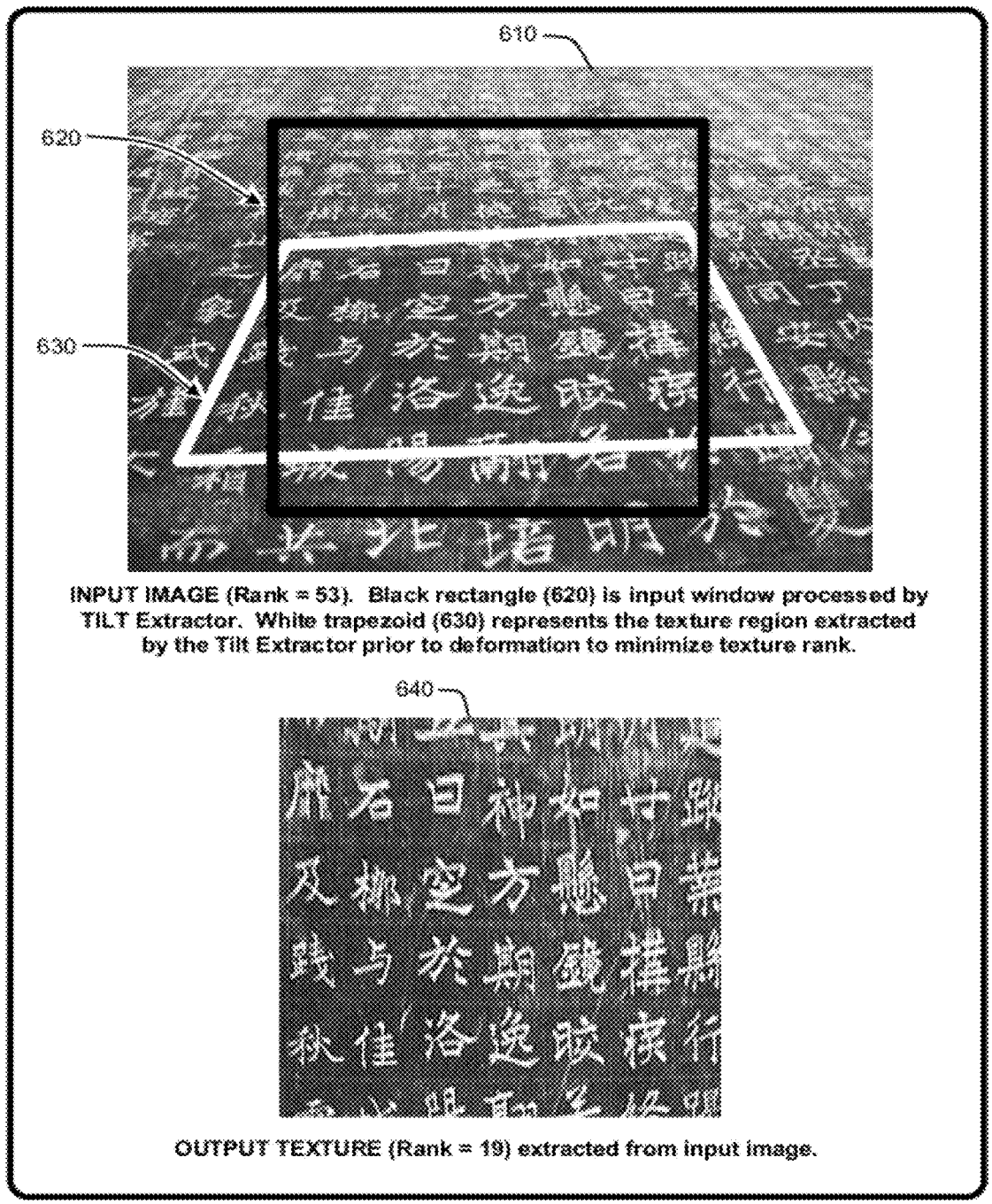
FIG. 6 illustrates an example of the extraction of a low-rank texture region from a high-rank input image, as described herein.
Figure 7:
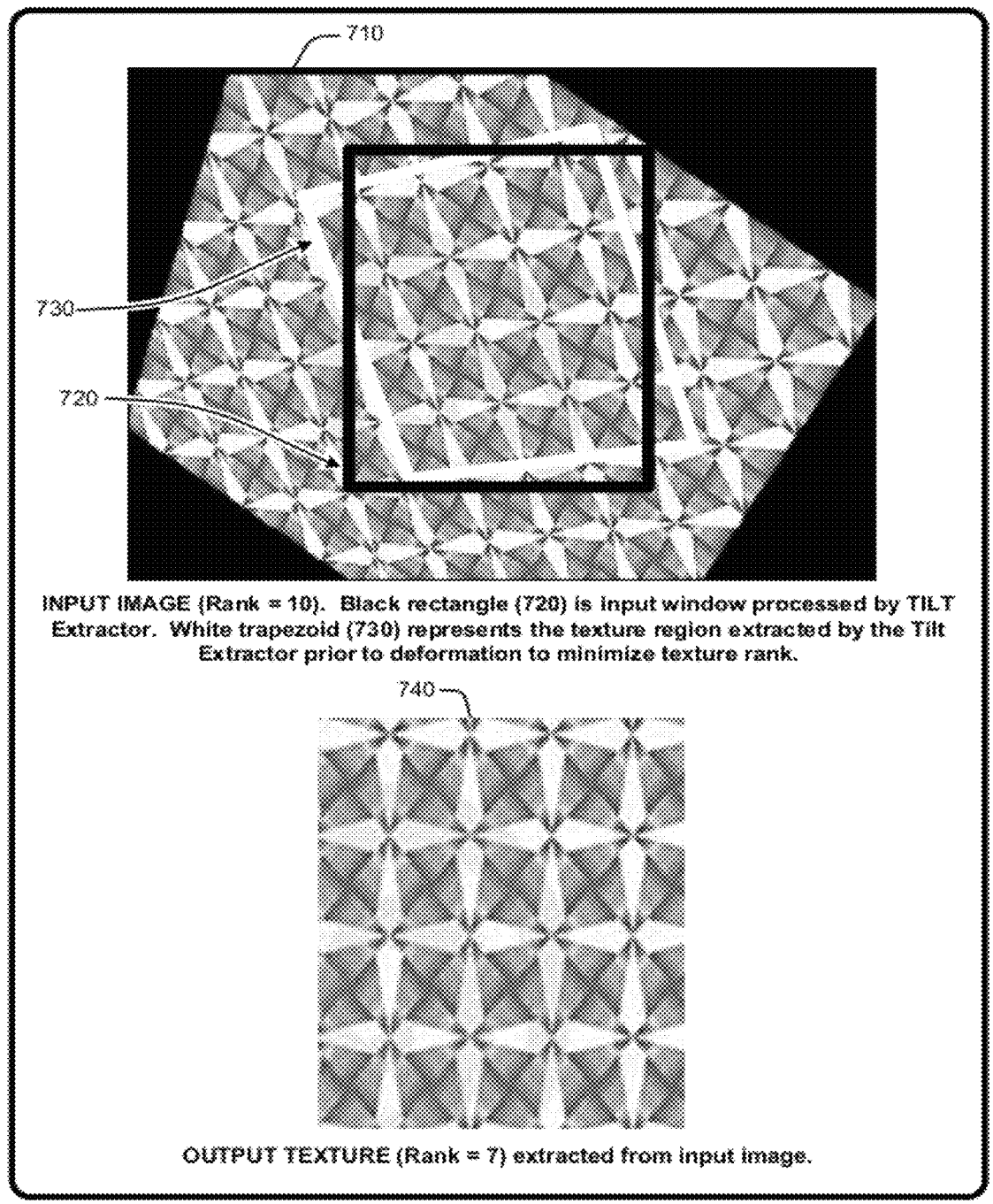
FIG. 7 illustrates an example of the extraction of a low-rank texture region from a high-rank input image, as described herein.
Figure 8:
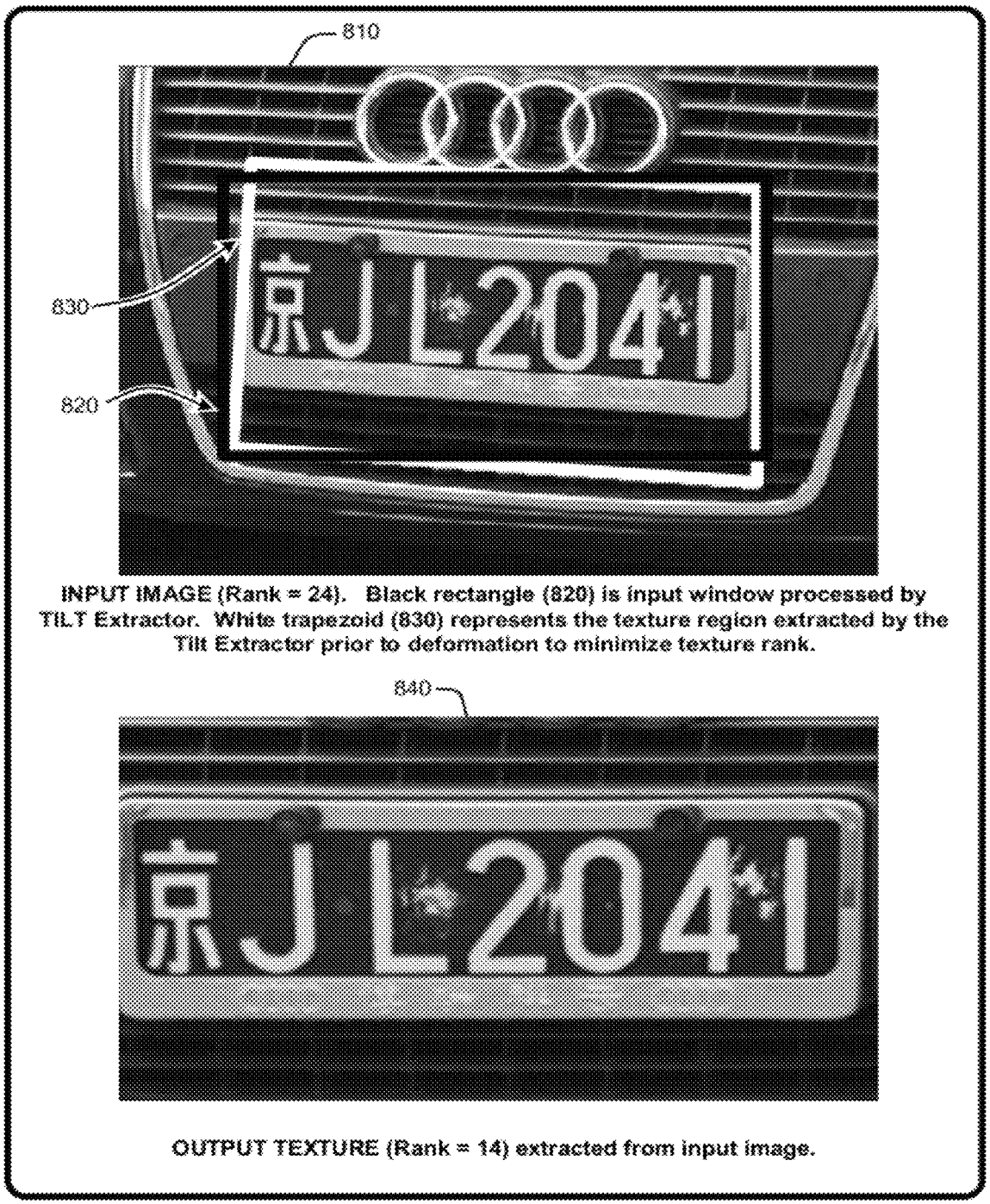
FIG. 8 illustrates an example of the extraction of a low-rank texture region from a high-rank input image, as described herein.

More specifically, FIG. 4 shows input image 410 having a rank R=35. Black rectangular region 420 shows the input window that is processed by the TILT Extractor to locate a texture region 430 that is then rectified using the geometric information extracted from the input image 410 to produce an output texture 440 having rank R=14. Similarly, FIG. 5 shows input image 510 having a rank R=15. Black rectangular region 520 shows the input window that is processed by the TILT Extractor to locate a texture region 530 that is then rectified using the geometric information extracted from the input image 510 to produce an output texture 540 having rank R=8. FIG. 6 shows input image 610 having a rank R=35. Black rectangular region 620 shows the input window that is processed by the TILT Extractor to locate a texture region 630 that is then rectified using the geometric information extracted from the input image 610 to produce an output texture 640 having rank R=19. FIG. 7 shows input image 710 having a rank R=10. Black rectangular region 720 shows the input window that is processed by the TILT Extractor to locate a texture region 730 that is then rectified using the geometric information extracted from the input image 710 to produce an output texture 740 having rank R=7. Finally, FIG. 8 shows input image 810 having a rank R=24. Black rectangular region 820 shows the input window that is processed by the TILT Extractor to locate a texture region 830 that is then rectified using the geometric information extracted from the input image 810 to produce an output texture 840 having rank R=14. Note the relatively large decrease between the rank of the input image and the output texture in each of the above examples.

Figure 9:
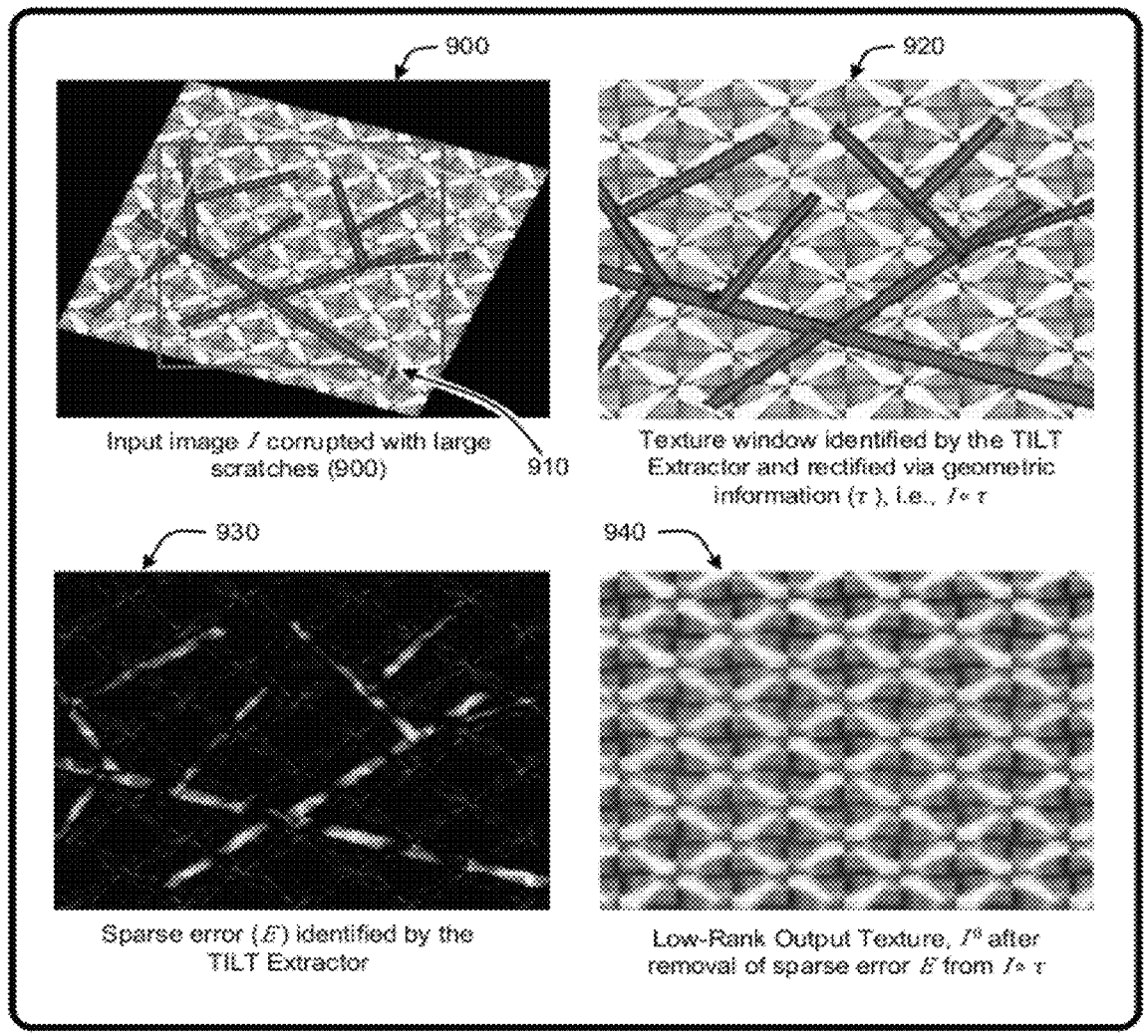
FIG. 9 illustrates an example of the extraction of a low-rank texture region and removal of sparse errors represented by significant occlusions in a complex texture from a high-rank input image, as described herein.
Figure 10:
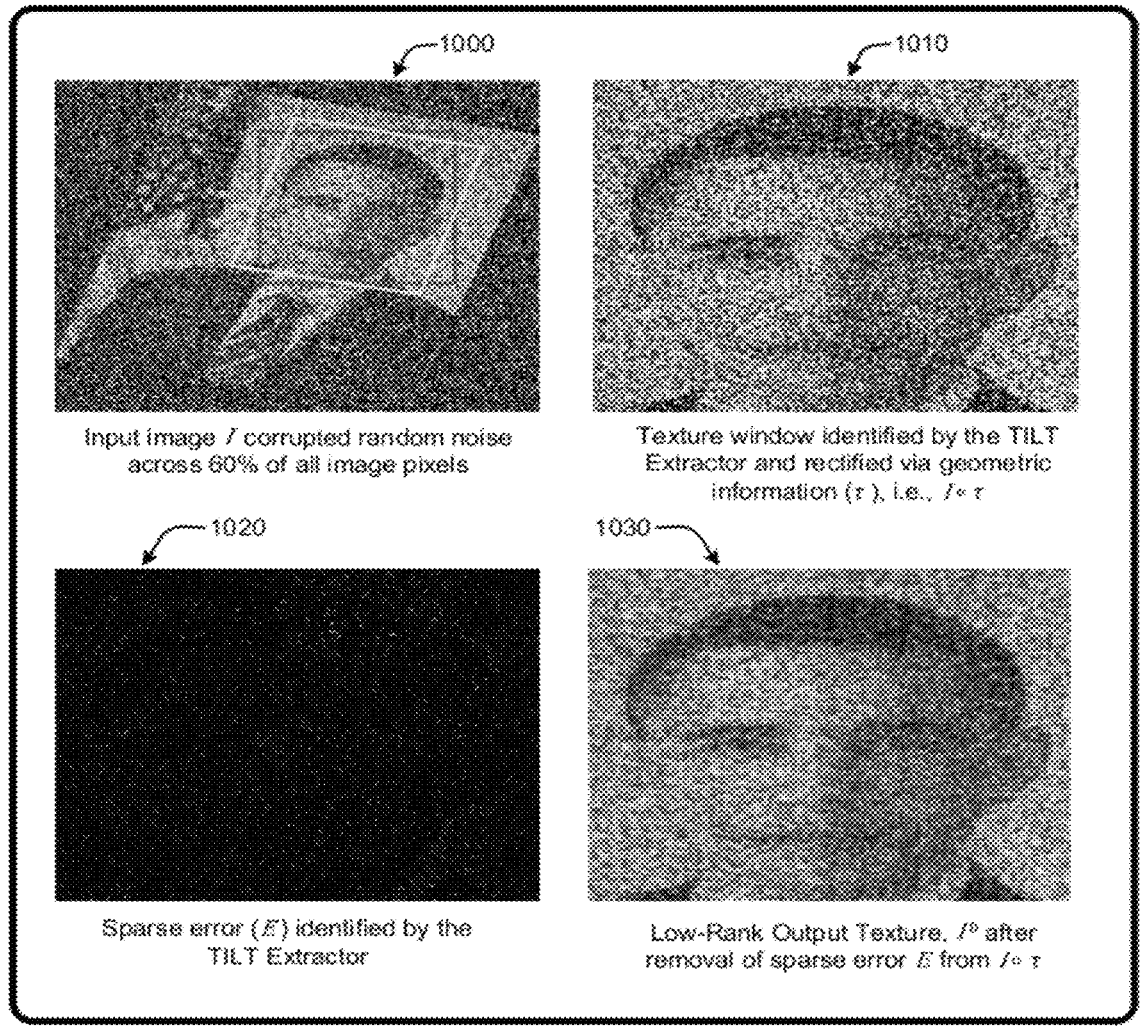
FIG. 10 illustrates an example of the extraction of a low-rank texture region and removal of sparse errors represented by significant noise across image pixels in a high rank image of a face in an input image, as described herein.

FIG. 9 and FIG. 10 further expand on the texture extraction capabilities of the TILT extractor by illustrating examples of using the sparse error (E) extracted from the input image to remove occlusions and noise from images.

In particular, FIG. 9 illustrates an input image 900 of a complex pattern corrupted with large "scratches" or occlusions 910. Following rectification of the input image 900 using the geometric information extracted by the TILT extractor, it can be seen that the corruption remains a large source of error in the rectified image 920. The sparse error (E) 930 extracted from the input image 900 by the TILT Extractor can be seen to approximately correspond to the corruption in the rectified image 920. Therefore, following elimination of the sparse error (E) using the iterative convex optimization techniques described above, it can be seen that the resulting output texture 940 provides a texture region that closely corresponds to the input image 900 but with the corruption or occlusions 910 eliminated from the input image.

Similarly, FIG. 10 illustrates an input image 1000 of a face corrupted with random noise across 60% of the image pixels. Following rectification of the face detected as a texture in the input image 1000 using the geometric information extracted by the TILT extractor, it can be seen that the noise remains a large source of error in the rectified image 1010 of the face. The sparse error (E) 1020 extracted from the input image 1000 by the TILT Extractor can be seen to approximately correspond to the noise corruption in the rectified image 1010. Therefore, following elimination of the sparse error (E) using the iterative convex optimization techniques described above, it can be seen that the resulting output texture 1030 provides a version of the face that closely corresponds to the input image 1000 but with some of the noise corruption eliminated relative to the original input image.

Figure 11:
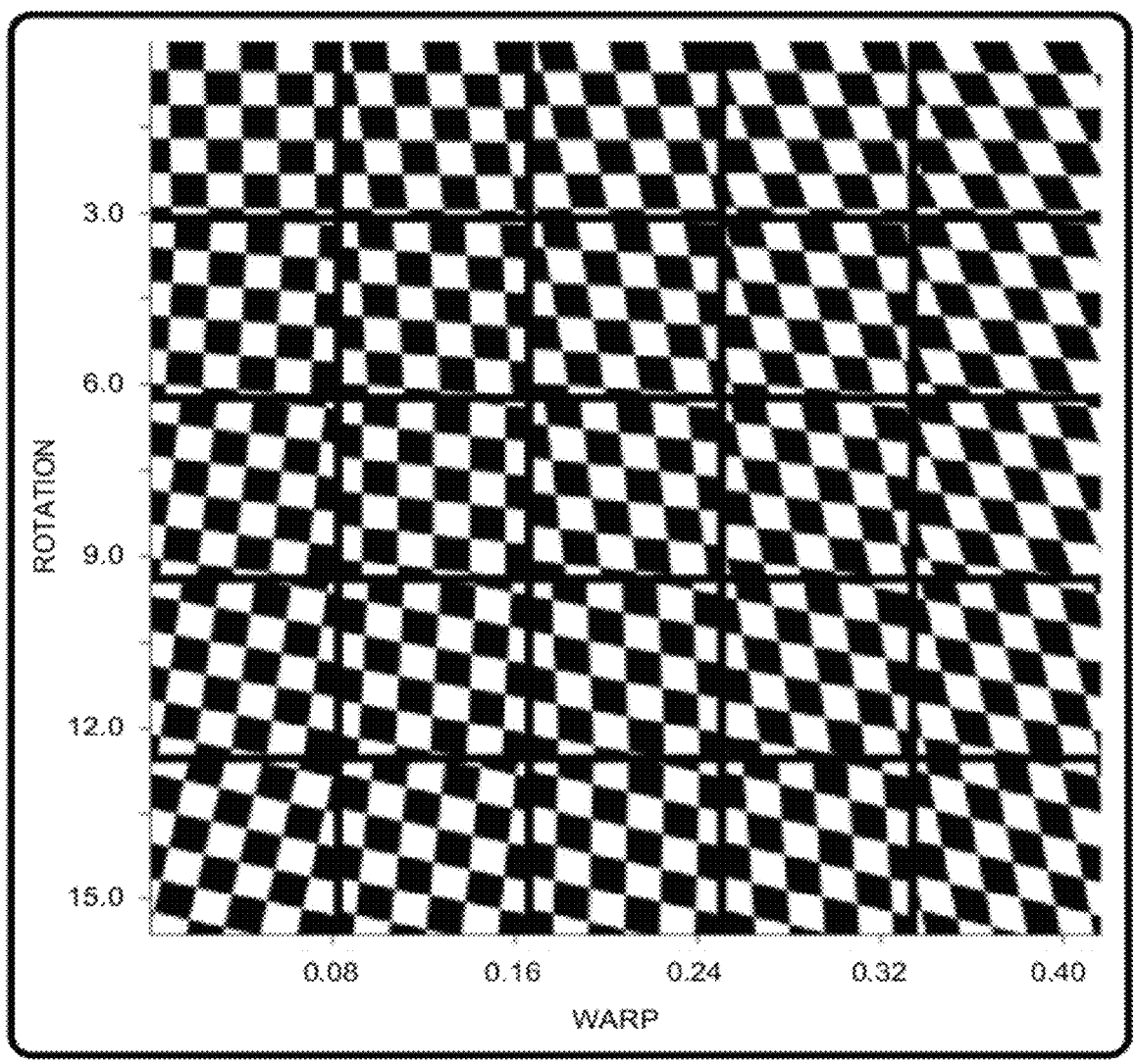
FIG. 11 illustrates an example of a checkerboard pattern deformed using a large range of affine transforms, as described herein.

2.6.2 Range of Convergence of the TILT Extractor:

For most low-rank textures, Algorithm 1 has a fairly large range of convergence, even without using the optional branch-and-bound techniques described in Section 2.5. To illustrate this point, consider the results of Algorithm 1 with a checkerboard image of FIG. 11 undergoing different ranges of affine transform: $y=Ax+b, x, y \in \mathbb{R}^2$.

In this example, the affine matrix A is parameterized as $$A(\theta, t) = \begin{bmatrix} \cos\theta & -\sin\theta \\ \sin\theta & \cos\theta \end{bmatrix} \times \begin{bmatrix} 1 & t \\ 0 & 1 \end{bmatrix}.$$

For purposes of explanation, (θ,t) is changed within the range $\theta \in [0, \pi/6]$ with step size π/60, and $t \in [0, 0.3]$ with step size 0.03. Note that these values are provided for purposes of explanation only, and that any desired values can be used here. Note that, for the example of FIG. 11, Algorithm 1 always converges up to θ=10° of rotation and skew (or warp) up to t=0.2. Note also that, due to its rich symmetries and sharp edges, a checkerboard is a challenging case for "global" convergence as at many rotated angles, its image corresponds to a local minimum that has low rank. In practice, it has been observed that for most symmetric patterns in typical urban scenes (e.g., buildings, cars, etc.), Algorithm 1 converges for the entire tested range without requiring the use of branch-and-bound.

Figure 12:
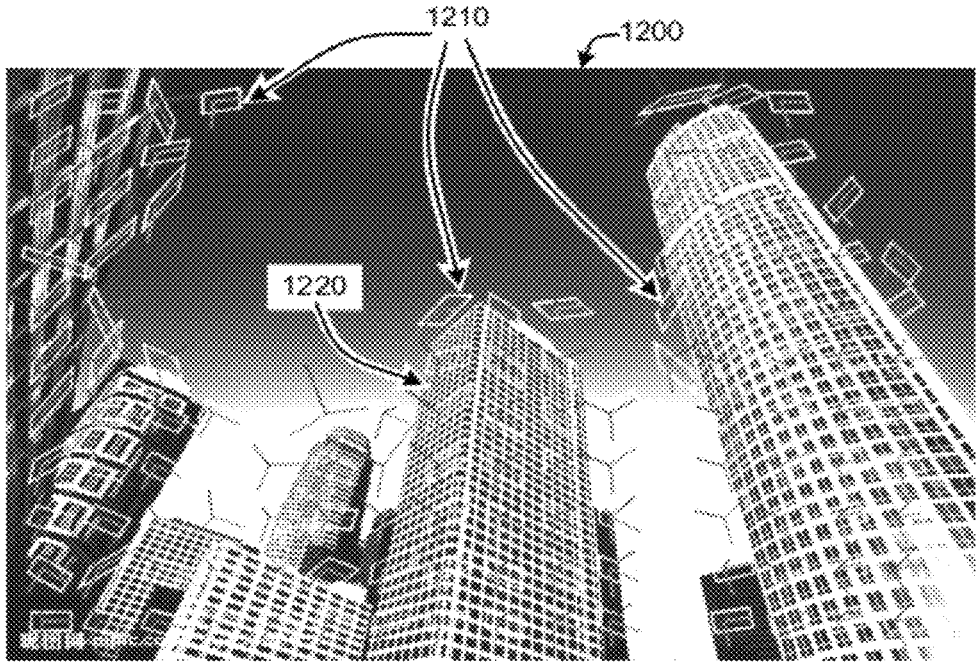
FIG. 12 illustrates an example of how the TILT Extractor extracts rich geometric and structure information (by extracting large numbers of texture regions) from an oblique image of a typical urban scene, and then uses the extracted geometric information to insert other pictures and text back into the original image, as described herein.
Figure 12:
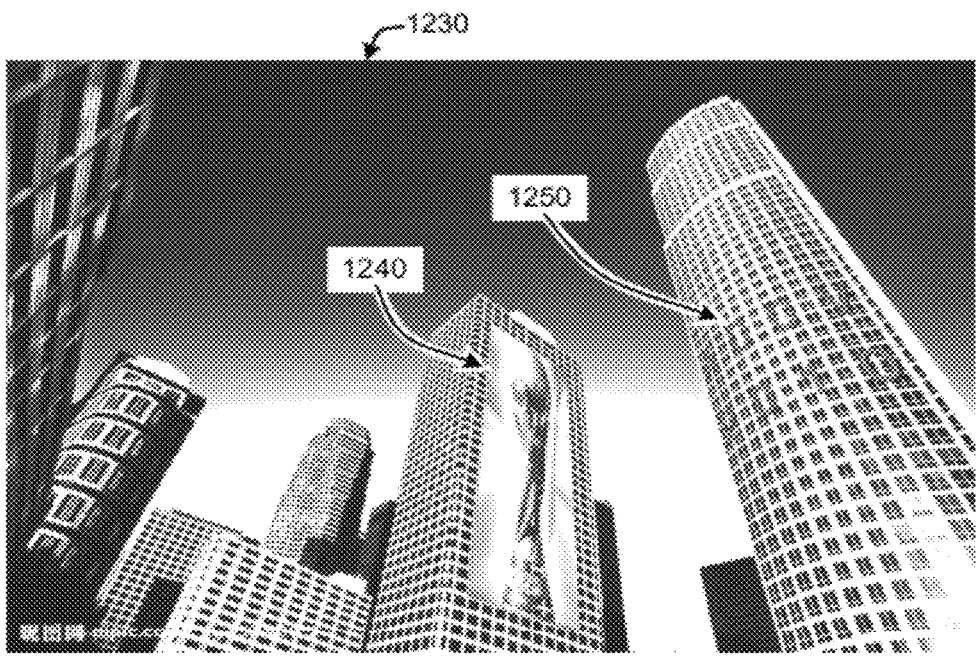

2.6.3 Shape from Low-rank Texture Detection:

Clearly, the rectified low-rank textures found by the TILT Extractor can facilitate many high-level vision tasks, including establishing correspondences among images, recognizing text and objects, reconstructing 3D shapes or structures in a scene, etc. However, for purposes of explanation, the following discussion will illustrate how the TILT Extractor extracts rich geometric and structure information (by extracting large numbers of texture regions) from an oblique image of a typical urban scene 1200, as shown in FIG. 12, and then using the extracted geometric information to insert other pictures and text back into the original image.

In this example, the original image size is 1024×685 pixels and the TILT Extractor runs Algorithm 1 (with affine transforms) on a grid of 60×60 pixel windows covering the image. If the rank of the resulting texture in any of the windows drops significantly from that of the original window, then the TILT Extractor is said to have "detected" a region with some low-rank structure. Note that the image rank is computed by thresholding the singular values of each detected texture at ⅓₀th of the largest one. Also, the TILT Extractor ignores away regions whose largest singular value is too small, which correspond to a smooth region like the sky in the example image of a typical urban scene 1200 of FIG. 12. Note that in FIG. 12, the resulting deformed windows (e.g., windows 1210) are drawn together with the local orientation and normal of the surface recovered from the affine transform found (i.e., $\tau$). Note also that for windows falling inside the boundaries of the various building façades, almost all correctly recover the local geometry; even for patches on the edge of the façades, since one of its sides typically aligns with the building's edge.

As noted above, window size is not fixed. As such, the user or a system implemented using the TILT Extractor can initialize the size of the windows at different sizes or scales. However, for larger regions, affine transforms will not be accurate enough to describe the deformation for a perspective projection. For instance, the entire façade of the middle building 1220 in FIG. 12 exhibits significant projective deformation. Nevertheless, if Algorithm 1 is initialized with the affine transform of a small patch on the façade (such as the grid of 60×60 pixel windows used in this example), the algorithm can easily converge to the correct homograpy (thereby recovering $\tau$) for each of the multiple texture regions recovered from the image.

With both the low-rank texture and their geometry correctly recovered, this information can then be easily used to perform many interesting tasks such as editing parts of the images that respect the true 3D shape and the correct perspective to produce an image such as output image 1230 where the geometric information extracted from the input image 1200 was used to correctly transform and insert an image of a trophy 1240 across one building surface and to transform and insert text 1250 (i.e., "ACCV 2010") on another building surface. In other words, in this example, geometric information ($\tau$) associated with each of the identified texture patches in regions of the image that were being edited was used to transform the image 1240 and text 1250 that was inserted into the output image 1230.

2.6.4 Rectifying Different Categories of Low-rank Textures:

Since, as noted above, Algorithm 1 has a very large range of convergence for both affine and projective deformations or transforms and it is also very robust to sparse corruption of the image intensity (or other color channel), it has been observed that the TILT Extractor works remarkably well for a very broad range of patterns, regular structures, and objects that arise in natural images or paintings. Note that such patterns need not be perfectly symmetrical or regular, and that the TILT Extractor works well with approximately symmetric or regular patterns. A few examples of such approximately regular or symmetric structures include, but are not limited to, leaves, faces, barcodes, manmade structures or objects, faces or objects in paintings, text, etc.

2.7 Additional Embodiments and Applications:

Clearly, there are many other possible applications of the TILT Extractor, such as symmetry detection, face rectification and alignment, etc. All these applications are based on the capability of the TILT Extractor to robustly and accurately extract both textural and geometric information of low-rank planar patterns or textures in an image. As low-rank planar patterns are ubiquitous in images, the TILT Extractor has a wide range of application. The following paragraphs describe examples of a few of the large number of applications that are enabled by use of the textures (i.e., $I^0$) and geometric information (i.e., $\tau$), and sparse error (i.e., E) extracted from images by the TILT Extractor. It should be understood that the TILT Extractor is not intended to be limited to use with the applications described below, and that the following examples of applications are provided only for purposes of explanation.

2.7.1 Image Super-resolution:

One of the main difficulties to obtaining a good quality super-resolution image from a low-resolution input is that the image may contain edges in many different orientations. Consequently, it is generally difficult to design a method or a dictionary that works well for all orientations. However, as explained above, the TILT Extractor is capable of precisely detecting the orientations ($\tau$) of the local patterns and stratifying the edges to horizontal or vertical (which is an inherent feature of the rank minimization process described above). The resulting super-resolution problem then becomes much easier since, due to the inherent rectification of the extracted textures, the super-resolution problem becomes one of simple scaling and alignment of easily matched texture regions. Such TILT-based super-resolution techniques work especially well for images of man-made environments or objects which are full of sharp edges and patterns, such as, for example, buildings, text, etc. It should be understood that given a set of correctly rectified textures (possibly at differing scales) extracted from a plurality of images of a scene, super-resolution operations can be performed using known techniques. Consequently, those techniques will not be described in detail herein.

2.7.2 Image/Video Enhancement:

As is well known, many relatively low-quality images videos are readily available from the Internet or other sources. Such low-quality images or videos contain noise, block effects, artifacts, etc. By combining the feature extraction capabilities of the TILT Extractor with other image alignment tools, the low-rank structures or features provided by the TILT Extractor from individual frames of a video can be used to remove noise and block effects or artifacts that often destroy the desired low-rank structures. Further, by combining the super-resolution techniques mentioned above, the resolution of the video sequence can be enhanced beyond that of the source videos (by processing two or more sequential image frames of the sequence as different examples of the same scene), while at the same time removing artifacts from the video. Note that video enhancement techniques such as those mentioned above are known to those skilled in the art, and will not be described in detail herein. The point to consider here is that it is the novel capabilities of the TILT Extractor in locating and extracting textures and associated geometric information from image frames that enables such enhancement processes to provide high-quality outputs.

2.7.3 Image/Video Editing and Augmented Reality:

As explained above, the TILT Extractor processes images to extract precise geometric orientations of a planar surface relative to an arbitrary viewpoint (or viewing direction) from which the image was captured. Therefore, following extraction, the texture can be edited on the stratified planar surface then mapped back to the original image using $\tau$ (i.e., the geometric information extracted in combination with the texture). This way, the edited part will maintain the correct perspective projection and respect the correct 3D geometry of the planar surface. An example of this idea was provided above in Section 2.6.3 with respect to FIG. 12.

Related interesting uses of this capability include the capability to add things such as banners, texts, or advertising logos to the image in such a way that these objects look as if they were in the original scene. In other words, by extracting a rectified texture, such as, for example a building façade, a rectified banner can be added to that rectified texture using conventional image editing techniques. By then mapping that edited texture back into the original image using the corresponding geometric information that was extracted along with the original texture (i.e., the building façade in this example) it will appear as if any added components were a part of the original image, having the precise orientation, perspective, scaling, etc., corresponding to the original texture.

2.7.4 Camera Auto-Calibration:

Camera calibration is a basic step in many applications related to cameras. A typical calibration rig often uses a low-rank pattern such as a checkerboard image. However, when captured by the camera, the image of the calibration rig is often distorted by both the perspective projection (i.e., camera viewing direction relative to the checkerboard) and the camera (radial) distortion (which is generally a relatively small distortion, depending upon the quality of the camera and lens). Therefore, given multiple images of the calibration rig, the TILT Extractor can concurrently recover distortion inherent to the camera and lens and the pose or orientation of the calibration rig by undoing the distortion (i.e., recovering $\tau$ across the viewing plane) and recovering the low-rank pattern. This information can then be applied to other images captured by that camera to automatically remove such distortions from those additional images. This avoids many difficulties in the conventional camera calibration method which relies on manually clicking on feature points on the images and detecting corners and edges. Advantageously, this method achieves per pixel alignment without any feature detection or extraction, and hence can achieve much better accuracy and autonomy then conventional auto-calibration techniques.

2.7.5 Text/Barcode/License Plate Recognition:

One challenge of text recognition is to estimate relative-orientation of the text to the camera view. However, by using the TILT Extractor, accurate estimation of the orientation is automatically returned (i.e., the geometric information provided by $\tau$) and is then used to automatically tilt or deform the text to its frontal view, regardless of the original camera viewing direction. This can greatly improve the recognition rate and accuracy of text recognition. Clearly, these improvements in text recognition will also be applicable to barcode recognition problems and many similar situations (digits in license plate, characters or symbols on traffic signs etc.), where the image was captured from some arbitrary oblique view or perspective. FIG. 8, discussed above, shows an example of a rectified license plate extracted as a texture region from an image of the front of a car.

2.7.6 Image Correspondence:

Establishing corresponding points and regions between images is a basic step for many computer vision tasks such as 3D reconstruction and object recognition. Conventional correspondence methods typically use point-like features such as SIFT or its variations. They normally cannot handle large baseline between views or lead to ambiguous correspondences when there are many similar features in the scene (such as urban environments).

However, the TILT Extractor provides the capability to extract much richer classes of image regions with low-rank textures than conventional techniques. Not only does the TILT Extractor extract the textures of particular regions, but it also extracts the relative geometry of those textures with respect to an arbitrary viewpoint or viewing direction. This information enables a variety of applications to easily establish precise correspondence of two rectified regions in different images even if the images were taken from drastically different viewpoints, since the primary difference at that point is generally only a matter of scaling (if any). Consequently, the resulting correspondence is generally more precise and less ambiguous than with conventional techniques since it is based on pixel-wise correspondence between two large regions, rather than correspondence of a few feature points between images.

2.7.7 3D Reconstruction:

Another interesting feature of the TILT Extractor is that by calibrating a camera accurately (see Section 2.7.4) using the TILT Extractor, then generating precise correspondence between regions in images with a large baseline. These tools then enable efficient 3D-reconstruction of man-made objects, structures, and environments. In other words, since the geometric orientation ($\tau$) is provided for all texture regions extracted from a scene, this information allows an accurate 3D-reconstruction of the scene. Note also that where a scene is captured from multiple orientations or viewing directions, accuracy of the relative geometry between texture regions in the scene can be further improved to construct a more accurate 3-D model of the scene.

Figure 13:
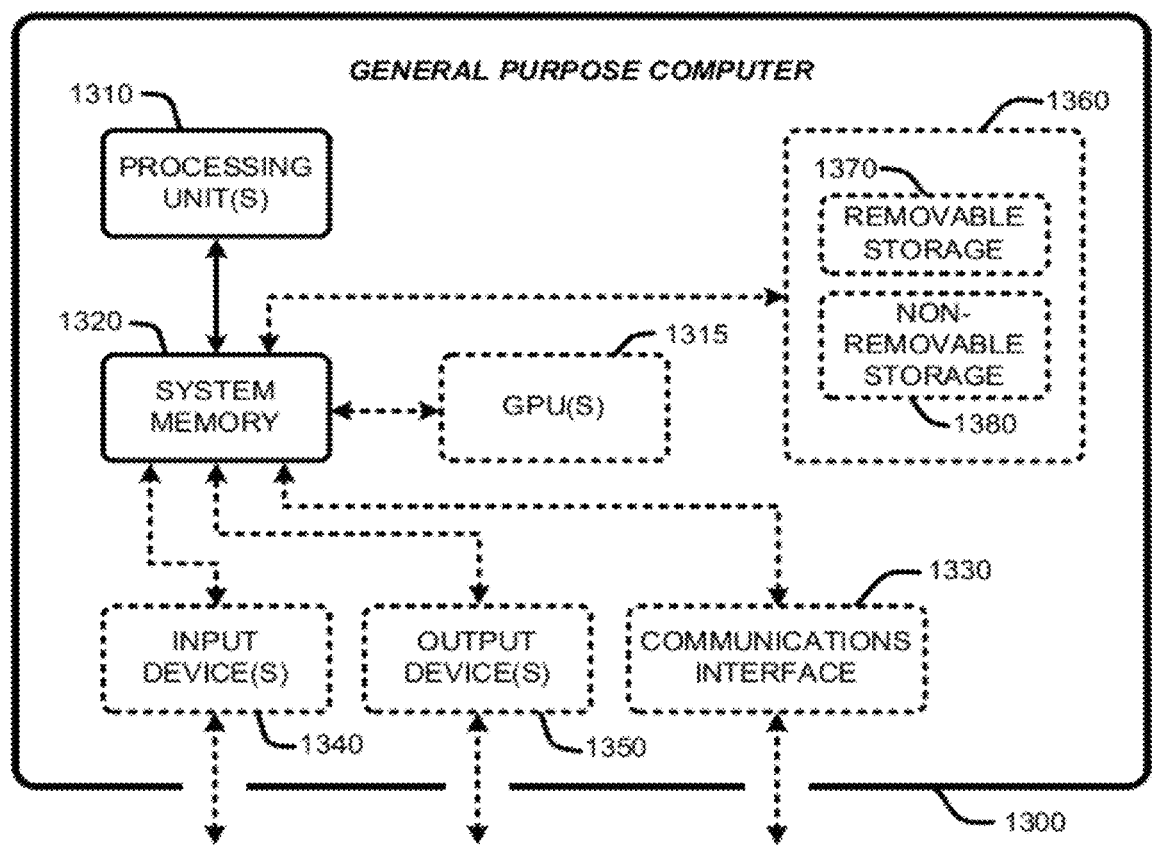
FIG. 13 is a general system diagram depicting a simplified general-purpose computing device having simplified computing and I/O capabilities for use in implementing various embodiments of the TILT Extractor, as described herein.

3.0 Exemplary Operating Environments:

The TILT Extractor described herein is operational within numerous types of general purpose or special purpose computing system environments or configurations. FIG. 13 illustrates a simplified example of a general-purpose computer system on which various embodiments and elements of the TILT Extractor, as described herein, may be implemented. It should be noted that any boxes that are represented by broken or dashed lines in FIG. 13 represent alternate embodiments of the simplified computing device, and that any or all of these alternate embodiments, as described below, may be used in combination with other alternate embodiments that are described throughout this document.

For example, FIG. 13 shows a general system diagram showing a simplified computing device 1300. Such computing devices can be typically be found in devices having at least some minimum computational capability, including, but not limited to, personal computers, server computers, handheld computing devices, laptop or mobile computers, communications devices such as cell phones and PDA's, multi-processor systems, microprocessor-based systems, set top boxes, programmable consumer electronics, network PCs, minicomputers, mainframe computers, video media players, etc.

To allow a device to implement the TILT Extractor, the device should have a sufficient computational capability and system memory. In particular, as illustrated by FIG. 13, the computational capability is generally illustrated by one or more processing unit(s) 1310, and may also include one or more GPUs 1315, either or both in communication with system memory 1320. Note that that the processing unit(s) 1310 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 13 may also include other components, such as, for example, a communications interface 1330. The simplified computing device of FIG. 13 may also include one or more conventional computer input devices 1340. The simplified computing device of FIG. 13 may also include other optional components, such as, for example, one or more conventional computer output devices 1350 or other machine or computer hardware. Finally, the simplified computing device of FIG. 13 may also include storage 1360 that is either removable 1370 and/or non-removable 1380. Such storage includes computer or machine readable media or storage devices including, but not limited to, DVD's, CD's, floppy disks, tape drives, hard drives, optical drives, solid state memory devices, etc.

Further, software, programs, and/or computer program products embodying the some or all of the various embodiments of the TILT Extractor described herein, or portions thereof, may be stored on any desired combination of computer or machine readable media or storage devices in the form of computer executable instructions. Note that typical communications interfaces 1330, input devices 1340, output devices 1350, and storage devices 1360 for general-purpose computers are well known to those skilled in the art, and will not be described in detail herein.

The foregoing description of the TILT Extractor has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the TILT Extractor. It is intended that the scope of the invention be limited not by this detailed description, but rather by the claims appended hereto.

What is claimed is:

1. A method for extracting textural and geometric information from an image, comprising steps for:
   receiving a single input image;
   selecting an image channel from available channels of a color space of the input image;
   windowing the input image into a plurality of windows;
   for each window of the input image, iterating steps for:
   normalizing the selected image channel,
   computing a Jacobian matrix from the normalized image channel with respect to a current geometric transformation,
   recovering a current low-rank texture from the normalized image channel by using an iterative convex optimization process to update the current geometric transformation and find the low-rank texture having a fewest number of nonzero entries that is equivalent to the normalized image channel relative to the current geometric transformation until local convergence of the geometric transformation is achieved, and
   repeating the iterated steps for each window until global convergence of the geometric transformation is achieved; and
   outputting the current low-rank texture and the current geometric transformation.

2. The method of claim 1 wherein the iterative convex optimization process further uses a sparse error to update the current geometric transformation and find the low-rank texture having a fewest number of nonzero entries that is equivalent to the normalized image channel relative to the current geometric transformation and a sparse error component extracted from the normalized image channel until local convergence of the geometric transformation is achieved.

3. The method of claim 2 further comprising eliminating the sparse error component from the outputted current low-rank texture.

4. The method of claim 2 wherein the iterative convex optimization process is performed by iteratively solving:

$$\min_{I^0, E, \tau} \mathrm{rank}(I^0) + \|E\|_0 \text{ subject to } I \circ \tau = I^0 + E,$$

where I represents a window of the input image, $\tau$ represents the current geometric transformation, $I^0$ represents the current output texture, and E represents the sparse error component.

5. The method of claim 2 wherein the sparse error component represents corruptions in the selected image channel of the input image.

6. The method of claim 2 further comprising weighting the sparse error component for use in the convex optimization process.

7. The method of claim 6 wherein the iterative convex optimization process is performed by iteratively solving:

$$\min_{I^0, E, \tau} \mathrm{rank}(I^0) + \gamma \|E\|_0 \text{ subject to } I \circ \tau = I^0 + E,$$

where I represents a window of the input image, $\tau$ represents the current geometric transformation, E represents the sparse error component, $I^0$ represents the current output texture, and $\gamma$ represents the weight applied to the sparse error component.

8. The method of claim 1 wherein the color space of the input image includes a brightness channel, and wherein the brightness channel is the selected image channel.

9. A system for deriving low-rank textures from an input image, comprising:
   a device for receiving a single input image;
   a device for windowing the input image into a plurality of windows;
   for each window of the input image, a device for iterating steps for:
   normalizing an intensity channel of the input image,
   computing a Jacobian matrix from the normalized intensity channel with respect to a current geometric transformation,
   recovering a current low-rank texture from the normalized intensity channel by using an iterative convex optimization process to update the current geometric transformation and a current sparse error component of the input image by finding the current low-rank texture having a fewest number of nonzero entries that is equivalent to the normalized intensity channel relative to the current geometric transformation and the current sparse error component of the input image until local convergence of the geometric transformation is achieved, and
   repeating the iterated steps for each window until global convergence of the geometric transformation is achieved; and
   a device for outputting the current low-rank texture, the current geometric transformation, and the current sparse error component.

10. The system of claim 9 further comprising a device for eliminating the sparse error component from the outputted current low-rank texture.

11. The system of claim 9 wherein the iterative convex optimization process is performed by iteratively solving:

$$\min_{I^0,E,\tau} \mathrm{rank}(I^0) + \|E\|_0 \text{ subject to } I \circ \tau = I^0 + E,$$

where I represents a window of the input image, τ represents the current geometric transformation, and E represents the sparse error component.

12. The system of claim 9 wherein the sparse error component represents corruptions in the intensity channel of the input image.

13. The system of claim 9 further comprising a device for weighting the sparse error component for use in the iterative convex optimization process.

14. The system of claim 13 wherein the iterative convex optimization process is performed by iteratively solving:

$$\min_{I^0,E,\tau} \mathrm{rank}(I^0) + \gamma\|E\|_0 \text{ subject to } I \circ \tau = I^0 + E,$$

where I represents a window of the input image, τ represents the current geometric transformation, E represents the sparse error component, $I^0$ represents the current output texture, and γ represents the weight applied to the sparse error component.

15. A computer-readable memory having computer executable instructions stored therein for extracting low-rank textural and geometric information and a sparse error component from an image, said instructions comprising:
  a device for receiving a single input image;
  a device for windowing the input image into a plurality of windows;
  for each window of the input image, a device for iterating steps for:
    normalizing an intensity channel of the input image,
    computing a Jacobian matrix from the normalized intensity channel with respect to a current geometric transformation,
    recovering a current low-rank texture from the normalized intensity channel by using an iterative convex optimization process to update the current geometric transformation and a current sparse error component of the input image by iteratively solving:

$$\min_{I^0,E,\Delta\tau} \|I^0\|_* + \lambda\|E\|_1 \text{ subject to } I \circ \tau + \nabla I \Delta\tau = I^0 + E,$$

until local convergence of the geometric transformation is achieved, where I represents a window of the input image, τ represents the current geometric transformation, $I^0$ represents the current output texture, and E represents the sparse error component;
    repeating the iterated steps for each window until global convergence of the geometric transformation is achieved; and
  a device for outputting the current low-rank texture, the current geometric transformation, and the current sparse error component for each window of the input image.

16. The computer-readable memory of claim 15 wherein the sparse error component represents corruptions in the input image.

17. The computer-readable memory of claim 15 further comprising removing the sparse error component from the outputted current low-rank texture.

18. The computer-readable memory of claim 15 further comprising extracting corresponding low-rank textures from a plurality of input images of a same scene captured from a plurality of different viewpoints, and wherein each of the plurality of input images is separately processed as a single unrelated input image for extracting the corresponding low-rank texture.

19. The computer-readable memory of claim 18 further comprising instruction for performing a super-resolution process by combining the corresponding low-rank textures to create a single enhanced resolution version of the corresponding low-rank textures.

20. The computer-readable memory of claim 15 wherein the input image is a known pattern having known deformations, and wherein the current geometric transformation for each window of the input image is used in combination with the known deformations of the known pattern to calibrate a camera used to capture the input image.

* * * * *